US012365181B2

(12) United States Patent
Watanabe et al.

(10) Patent No.: US 12,365,181 B2
(45) Date of Patent: Jul. 22, 2025

(54) LIQUID EJECTING APPARATUS

(71) Applicant: SEIKO EPSON CORPORATION, Tokyo (JP)

(72) Inventors: Eiichiro Watanabe, Matsumoto (JP); Hiroaki Okui, Azumino (JP); Yu Hasegawa, Shiojiri (JP)

(73) Assignee: SEIKO EPSON CORPORATION (JP)

( * ) Notice: Subject to any disclaimer, the term of this patent is extended or adjusted under 35 U.S.C. 154(b) by 242 days.

(21) Appl. No.: 18/308,055

(22) Filed: Apr. 27, 2023

(65) Prior Publication Data

US 2023/0347645 A1 Nov. 2, 2023

(30) Foreign Application Priority Data

Apr. 28, 2022 (JP) ................................ 2022-074899

(51) Int. Cl.
*B41J 2/045* (2006.01)
*B41J 2/165* (2006.01)
*B41J 2/18* (2006.01)

(52) U.S. Cl.
CPC ........... *B41J 2/165* (2013.01); *B41J 2/04581* (2013.01); *B41J 2/04596* (2013.01); *B41J 2/18* (2013.01); *B41J 2/16505* (2013.01); *B41J 2002/16573* (2013.01); *B41J 2202/12* (2013.01)

(58) Field of Classification Search
CPC .................................................... B41J 2/04596
See application file for complete search history.

(56) References Cited

U.S. PATENT DOCUMENTS

2010/0238238 A1* 9/2010 Yamamoto ................. B41J 2/18 347/85
2010/0283808 A1* 11/2010 Terakado ................... B41J 2/18 347/6
2013/0208034 A1 8/2013 Zhang
2016/0271943 A1* 9/2016 Tobita .................. B41J 2/04581
2019/0143709 A1* 5/2019 Tokimatsu ........... B41J 2/17563 347/92
2021/0023847 A1* 1/2021 Kachi .................... B41J 13/226

FOREIGN PATENT DOCUMENTS

JP 2013-163290 A 8/2013

* cited by examiner

*Primary Examiner* — Shelby L Fidler
(74) *Attorney, Agent, or Firm* — Harness, Dickey & Pierce, P.L.C.

(57) ABSTRACT

A liquid ejecting apparatus includes a liquid ejection head, a circulation control section that controls a circulation operation of circulating the liquid in the first individual flow path, and a minute vibration control section that supplies a drive signal having a first waveform to the first piezoelectric element so as to control a minute vibration operation of causing the liquid in the first nozzle to vibrate to such a degree that the liquid is not ejected from the first nozzle. The circulation control section starts the circulation operation at a first time, and the minute vibration control section starts the minute vibration operation at a second time earlier than the first time.

19 Claims, 17 Drawing Sheets

FIG. 20

| Sd | CONTENTS OF DESIGNATION OF Sd | SL1a,SL1b | SL2a,SL2b |
|---|---|---|---|
| (1) | EJECTION OPERATION | H | L |
| (0) | MINUTE VIBRATION OPERATION | L | H |

LIQUID EJECTING APPARATUS

The present application is based on, and claims priority from JP Application Serial Number 2022-074899, filed Apr. 28, 2022, the disclosure of which is hereby incorporated by reference herein in its entirety.

BACKGROUND

1. Technical Field

The present disclosure relates to a liquid ejecting apparatus.

2. Related Art

In a liquid ejecting apparatus that ejects liquid such as ink, for example, thickening of liquid due to evaporation of a solvent such as moisture contained in the liquid causes a problem. The thickening of the liquid causes a decrease in ejection property, that is, a decrease in one or both of ejection amount and ejection rate. Disclosed in JP-A-2013-163290 is a liquid ejecting apparatus including a nozzle that ejects liquid and an individual flow path through which liquid is supplied to the nozzle and through which liquid not ejected from the nozzle is discharged. The liquid ejecting apparatus performs a circulation operation of circulating liquid in the individual flow path and a minute vibration operation of causing minute vibration of liquid, of which thickening has been progressed, so that local thickening in the vicinity of the nozzle is eliminated.

However, in the above-described liquid ejecting apparatus in the related art, a decrease in ejection property caused by thickening occurs in some cases even when the circulation operation and the minute vibration operation are performed.

SUMMARY

According to an aspect of the present disclosure, there is provided a liquid ejecting apparatus including a liquid ejection head including a first piezoelectric element that is driven in response to supply of a drive signal, a first nozzle that ejects liquid by means of a pressure that is applied when the first piezoelectric element is driven, and a first individual flow path that communicates with the first nozzle, through which the liquid is supplied to the first nozzle, and through which the liquid not ejected from the first nozzle is discharged, a circulation control section that controls a circulation operation of circulating the liquid in the first individual flow path, and a minute vibration control section that supplies a drive signal having a first waveform to the first piezoelectric element so as to control a minute vibration operation of causing the liquid in the first nozzle to vibrate to such a degree that the liquid is not ejected from the first nozzle. The circulation control section starts the circulation operation at a first time, and the minute vibration control section starts the minute vibration operation at a second time earlier than the first time.

BRIEF DESCRIPTION OF THE DRAWINGS

FIG. 20 is a description diagram for description of generation of coupling state designation signals.

DESCRIPTION OF EXEMPLARY EMBODIMENTS

Hereinafter, embodiments of the present disclosure will be described with reference to the drawings. Note that, the dimensions and scales of each part shown in each drawing are different from the actual dimensions and scales as appropriate. In addition, since the embodiments to be described below are suitable specific examples of the present disclosure, various technically-preferable limitations are provided to the embodiments. However, the range of the present disclosure is not limited to the embodiments unless there is no description to the effect that the present disclosure is limited hereinafter.

For the sake of convenience, the following description will be made while appropriately using an X-axis, a Y-axis, and a Z-axis that intersect with each other. In addition, a direction extending along the X-axis is an X1 direction, and a direction opposite to the X1 direction is an X2 direction. Similarly, directions that extend along the Y-axis and are opposite to each other are a Y1 direction and a Y2 direction. In addition, directions that extend along the Z-axis and are opposite to each other are a Z1 direction and a Z2 direction. Here, typically, the Z-axis is a vertical axis, and the Z2 direction corresponds to a downward vertical direction. However, the Z-axis does not need to be the vertical axis and may be inclined with respect to the vertical axis. In addition, although the X-axis, the Y-axis, and the Z-axis are typically orthogonal to each other, the present disclosure is not limited thereto. For example, the X-axis, the Y-axis, and the Z-axis only need to intersect each other at an angle within a range of 80 degrees or more and 100 degrees or less.

1. First Embodiment

1-1. Liquid Ejecting Apparatus 100

Figure 1:
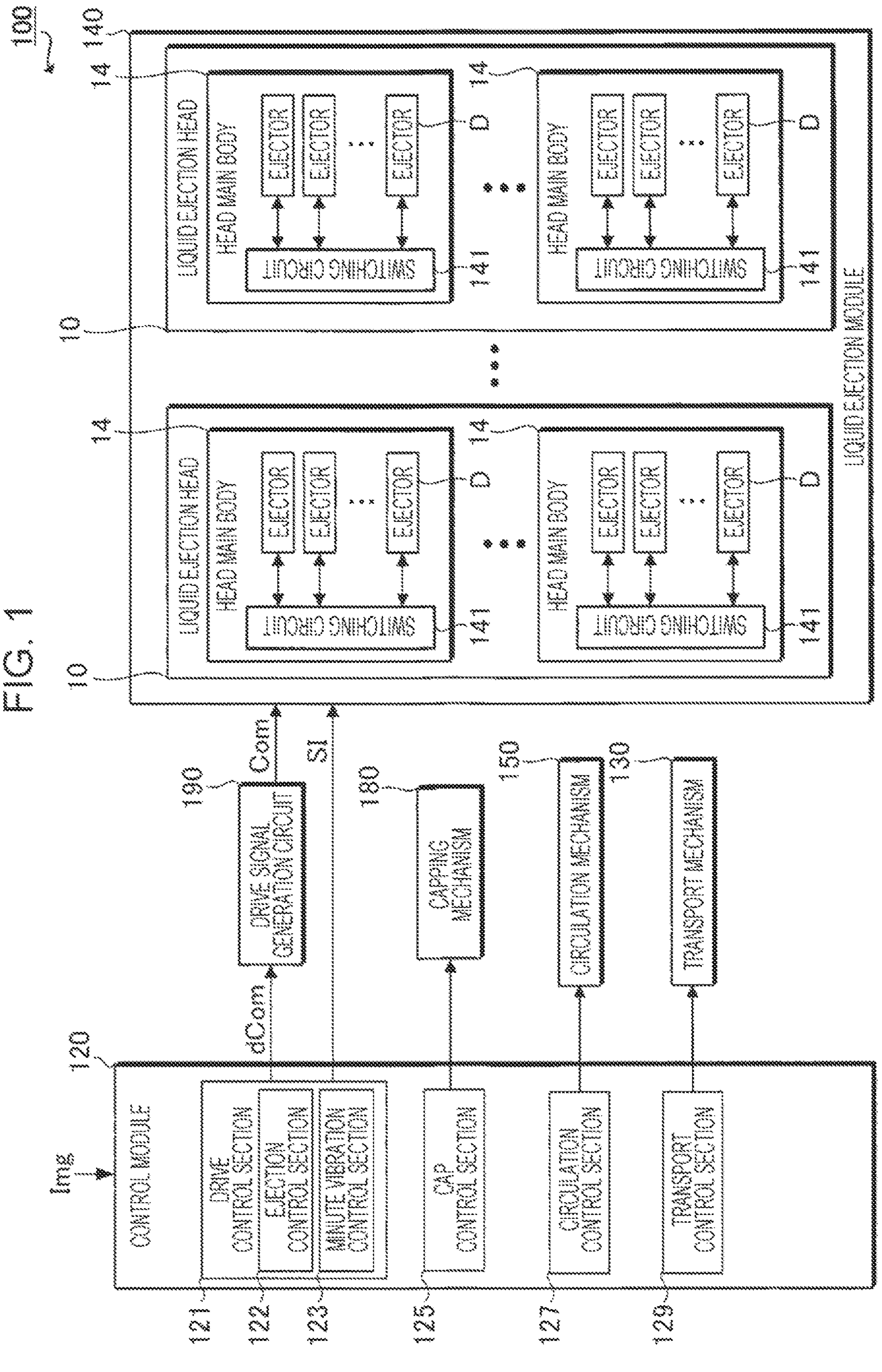
FIG. 1 is a functional block diagram showing an example of the configuration of a liquid ejecting apparatus according to a first embodiment.
Figure 2:
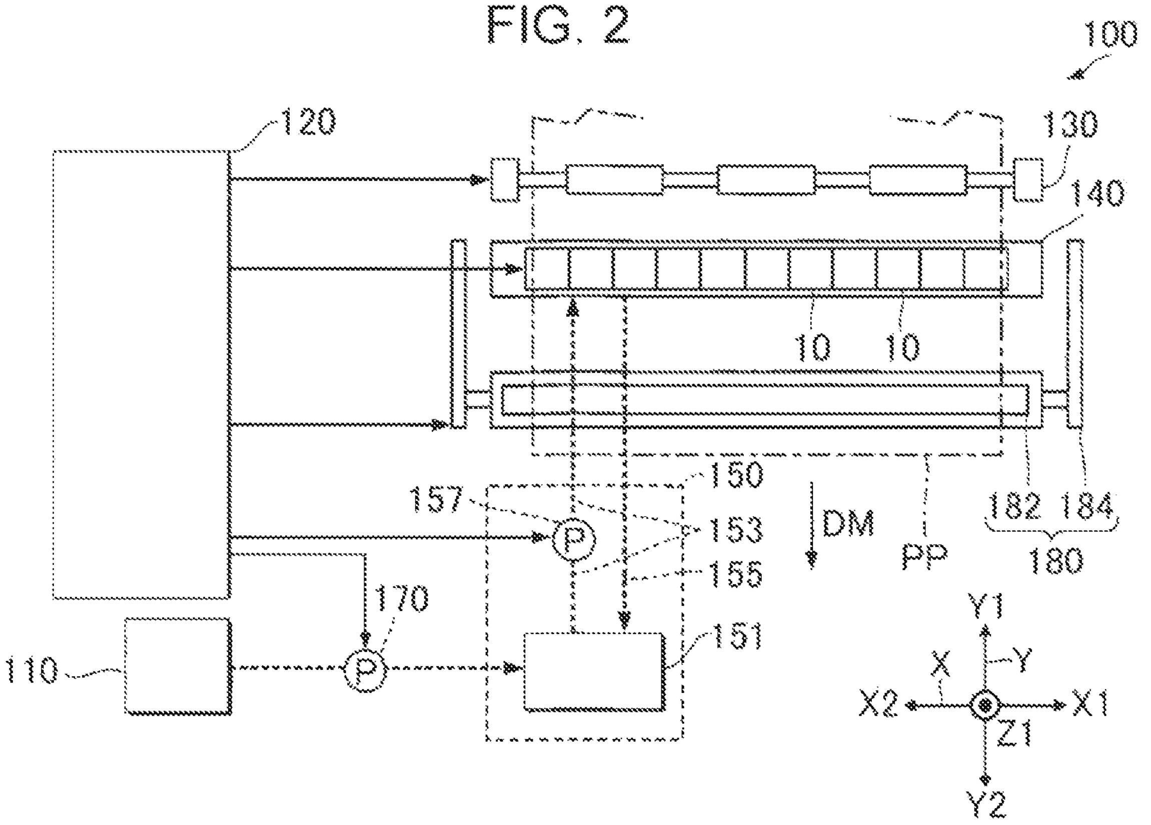
FIG. 2 is a schematic diagram showing the liquid ejecting apparatus.

The configuration of a liquid ejecting apparatus 100 will be described with reference to FIGS. 1 and 2. FIG. 1 is a functional block diagram showing an example of the configuration of the liquid ejecting apparatus 100 according to a first embodiment. FIG. 2 is a schematic diagram showing the liquid ejecting apparatus 100. The liquid ejecting apparatus 100 is an ink jet printing apparatus that ejects ink, which is an example of liquid, onto a medium PP in the form of droplets. The liquid ejecting apparatus 100 of the first embodiment is a so-called line-type printing apparatus in which a plurality of nozzles N for ejection of ink are distributed over the entire medium PP in the width direction. The medium PP is, typically, printing paper. Note that, the medium PP is not limited to printing paper and may be a printing target formed of any material such as a resin film or cloth.

The ink according to the first embodiment has a feature that thickening of the ink is easily progressed since a solvent such as moisture contained in the ink is volatile and is easily evaporated or a feature that thickening of the ink is easily progressed when a solvent is evaporated.

As shown in FIGS. 1 and 2, the liquid ejecting apparatus 100 includes a liquid supply source 110, a control module 120, a transport mechanism 130, a liquid ejection module 140, a circulation mechanism 150, a pump 170, a capping mechanism 180, and a drive signal generation circuit 190.

The liquid supply source 110 is a container storing ink. Specific examples of the liquid supply source 110 include a cartridge detachable from the liquid ejecting apparatus 100, a bag-shaped ink pack formed of a flexible film, and an ink tank refillable with ink. Note that, any type of ink is stored in the liquid supply source 110.

Although not shown in the drawings, the liquid supply source 110 of the first embodiment includes a first liquid container and a second liquid container. First ink is stored in the first liquid container. Second ink, which is a different type of ink from the first ink, is stored in the second liquid container. For example, the first ink and the second ink are inks of which the colors are different from each other. The first ink and the second ink may be the same type of ink.

The control module 120 controls the operation of each element in the liquid ejecting apparatus 100. The control module 120 includes, for example, one or more processing circuits such as CPUs or FPGAs, and one or more storage circuits such as semiconductor memories. "CPU" is an abbreviation for "Central Processing Unit". "FPGA" is an abbreviation for "Field Programmable Gate Array". Various programs and various data are stored in the storage circuit. The processing circuit realizes various types of control by executing the programs and appropriately using the data.

The transport mechanism 130 transports the medium PP in a direction DM under the control of the control module 120. The direction DM in the first embodiment is the Y2 direction. In an example shown in FIG. 2, the transport mechanism 130 includes a transport roller that is long along the X-axis and a motor that rotates the transport roller. Note that, the configuration of the transport mechanism 130 is not limited to a configuration in which the transport roller is used, and may be a configuration in which a drum or an endless belt that transports the medium PP sticking fast to an outer peripheral surface because of an electrostatic force or the like, for example.

Under the control of the control module 120, the liquid ejection module 140 ejects ink to the medium PP in the Z2 direction from each of the plurality of nozzles N, the ink being supplied from the liquid supply source 110 via the circulation mechanism 150. The liquid ejection module 140 is a line head including a plurality of liquid ejection heads 10 that are disposed such that the plurality of nozzles N are distributed over the entire medium PP in a direction along the X-axis. That is, a group of the plurality of liquid ejection heads 10 constitutes a long line head that extends in the direction along the X-axis. When ejection of ink from the plurality of liquid ejection heads 10 is performed in parallel with transportation of the medium PP which is performed by the transport mechanism 130, an image is formed on a surface of the medium PP by means of ink. Note that, the plurality of nozzles N that one liquid ejection head 10 includes may be disposed to be distributed over the entire medium PP in the direction along the X-axis and in this case, for example, the liquid ejection module 140 is composed of the one liquid ejection head 10.

The liquid supply source 110 is coupled to the liquid ejection module 140 via the circulation mechanism 150. The circulation mechanism 150 is a mechanism that supplies ink to the liquid ejection module 140 and that retrieves ink discharged from the liquid ejection module 140 for re-supply to the liquid ejection module 140 under the control of the control module 120. In an example shown in FIG. 2, the circulation mechanism 150 includes a sub tank 151 for storage of ink, a supply flow path 153 for supply of ink from the sub tank 151 to the liquid ejection module 140, a retrieval flow path 155 for retrieval of ink from the liquid ejection module 140 to the sub tank 151, and a pump 157 that causes ink to appropriately flow. The sub tank 151, the supply flow path 153, the retrieval flow path 155, and the pump 157 are provided for each of the above-described first liquid container and the above-described second liquid container. Ink is supplied from the liquid supply source 110 to the sub tank 151 with the control module 120 controlling the pump 170. With the circulation mechanism 150 being operated, it is possible to suppress an increase in viscosity of ink and to suppress retention of air bubbles in ink.

The supply flow path 153 is positioned upstream of the liquid ejection module 140 in a direction in which ink flows. The retrieval flow path 155 is positioned downstream of the liquid ejection module 140 in the direction in which ink flows. In the example of FIG. 2, the pump 157 is provided in the supply flow path 153. That is, the pump 157 is provided upstream of the liquid ejection module 140. However, the pump 157 may be provided in the retrieval flow path 155 (that is, the pump 157 may be provided downstream of the liquid ejection module 140). Alternatively, the circulation mechanism 150 may include a plurality of pumps, a portion of the plurality of pumps may be provided in the supply flow path 153, and the remainder of the plurality of pumps may be provided in the retrieval flow path 155. In addition, the circulation mechanism 150 may include a compressor instead of the pump 157. The pump 157 and the compressor are an example of "one or more flow mechanisms provided at one or both of a position upstream of a liquid ejection head and a position downstream of the liquid ejection head".

The capping mechanism 180 is a mechanism provided to seal nozzle surfaces FN provided with the nozzles N. The capping mechanism 180 includes a cap 182 and a cap mover 184. The cap 182 seals the nozzle surfaces FN provided with the nozzles N. The cap mover 184 moves the cap 182 relative to the liquid ejection module 140 along the Y-axis and the Z-axis under the control of the control module 120. The cap mover 184 is composed of, for example, a guide rail, a motor, and the like. The cap mover 184 moves the cap 182 relative to each of the plurality of liquid ejection heads 10 in the Z1 direction during a period in which ink is not ejected to the medium PP from each of the plurality of liquid ejection heads 10 so that a tip end portion of the cap 182 comes into contact with the nozzle surfaces FN of the plurality of liquid ejection heads 10 and the nozzle surfaces FN are covered by the cap 182 at least partially. The nozzle surfaces FN will be described later with reference to FIG. 6.

Hereinafter, an operation of sealing the nozzle surfaces FN by means of the cap 182 will be described as a "cap sealing operation", and an operation of unsealing the nozzle surfaces FN sealed by the cap 182 will be described as "cap unsealing operation". Note that, the cap mover 184 may cause the nozzle surfaces FN to be sealed by moving the liquid ejection module 140 instead of moving the cap 182.

The liquid ejection head 10 includes one or more head main bodies 14 that eject ink. In the first embodiment, one liquid ejection head 10 includes six head main bodies 14. The head main body 14 includes M ejectors D that eject ink and a switching circuit 141. In the first embodiment, M is an integer of 2 or more. Note that M may also be 1.

Hereinafter, for distinction between the M ejectors D that one head main body 14 includes, the ejectors D may be referred to as a first-stage ejector, a second-stage ejector, . . . , and an Mth-stage ejector in order. In addition, an mth-stage ejector D may be referred to as an "ejector D[m]". In the following description, the variable m is an integer of 1 or more and M or less. In addition, when a component of the liquid ejecting apparatus 100, a signal, or the like corresponds to the ordinal number "m" of the ejector D[m], a suffix "[m]" that indicating that the component, the signal, or the like corresponds to the ordinal number "m" may be added to a symbol representing the component, the signal, or the like.

The switching circuit 141 switches, based on a designation signal SI, whether or not a drive signal Com output from the drive signal generation circuit 190 is to be supplied to each ejector D.

The control module 120 reads a program from the storage circuit in the control module 120 and executes the read program to function as a drive control section 121, a cap control section 125, a circulation control section 127, and a transport control section 129. However, a device that functions as the drive control section 121, a device that functions as the cap control section 125, a device that functions as the circulation control section 127, and a device that functions as the transport control section 129 may not be the same device. For example, a device that functions as the drive control section 121, a device that functions as the cap control section 125, a device that functions as the circulation control section 127, and a device that functions as the transport control section 129 may be different devices.

The drive control section 121 controls the operation of the ejectors D. More specifically, the drive control section 121 generates the designation signal SI for control of the ejectors D and a waveform designation signal dCom for control of the drive signal generation circuit 190. The waveform designation signal dCom is a digital signal that defines the waveform of the drive signal Com. In addition, the drive signal Com is an analog signal used to drive the ejectors D. The drive signal generation circuit 190 includes a DA conversion circuit and generates the drive signal Com having a waveform defined by the waveform designation signal dCom. Note that, in the first embodiment, it will be assumed that the drive signal Com includes a drive signal Com-A and a drive signal Com-B.

In addition, the designation signal SI is a digital signal for designation of the type of operation of the ejectors D. Specifically, the designation signal SI designates the type of operation of the ejectors D by designating whether or not the drive signal Com is to be supplied to the ejectors D. Here, the designation of the type of operation of the ejectors D is, for example, designating whether or not the ejectors D are to be driven or designating whether or not ink is to be ejected from the ejectors D when the ejectors D are driven. When the ejectors D are to be driven to perform a printing ejection operation in which ink is ejected from the nozzles N of the ejectors D so that dots constituting an image are formed on the medium PP, the drive control section 121 functions as an ejection control section 122 that controls the ejection operation. Meanwhile, when the ejectors D are to be driven to perform a minute vibration operation in which ink in the nozzles N is caused to vibrate to such a degree that no ink is ejected from the nozzles N, the drive control section 121 functions as a minute vibration control section 123 that controls the minute vibration operation. The printing ejection operation is an example of an "ejection operation of causing liquid to be ejected from a first nozzle".

The cap control section 125 controls the capping mechanism 180. More specifically, the cap control section 125 outputs a signal for control of the capping mechanism 180 to the capping mechanism 180 to control the cap unsealing operation.

The circulation control section 127 controls the circulation mechanism 150. More specifically, the circulation control section 127 outputs a signal for control of the circulation mechanism 150 to the circulation mechanism 150 to generate a pressure difference between a position upstream of the liquid ejection head 10 and a position downstream of the liquid ejection head 10 and to control a circulation operation of circulating ink in an individual flow path PJ which will be described later.

The transport control section 129 controls the transport mechanism 130. More specifically, the transport control section 129 outputs a signal for control of the transport mechanism 130 to the transport mechanism 130.

First, the control module 120 stores printing data Img in a storage circuit in the control module 120, the printing data Img being supplied from a host computer. Next, the control module 120 generates, based on various types of data such as the printing data Img stored in the storage circuit, the designation signal SI, the waveform designation signal dCom, a signal for control of the transport mechanism 130, a signal for control of the capping mechanism 180, a signal for control of the circulation mechanism 150, and a signal for control of the pump 170. Then, the control module 120 controls, based on the various control signals and the various types of data stored in the storage circuit, the liquid ejection module 140 such that the ejectors D are driven while controlling the transport mechanism 130 such that the position of the medium PP relative to the liquid ejection module 140 is changed. In this manner, the control module 120 adjusts whether or not ink is ejected from the ejectors D, the amount of ejection of ink, the timing of ejection of ink, and the like and controls performance of a printing process of forming an image corresponding to the printing data Img on the medium PP.

1-2. Liquid Ejection Module 140

Figure 3:
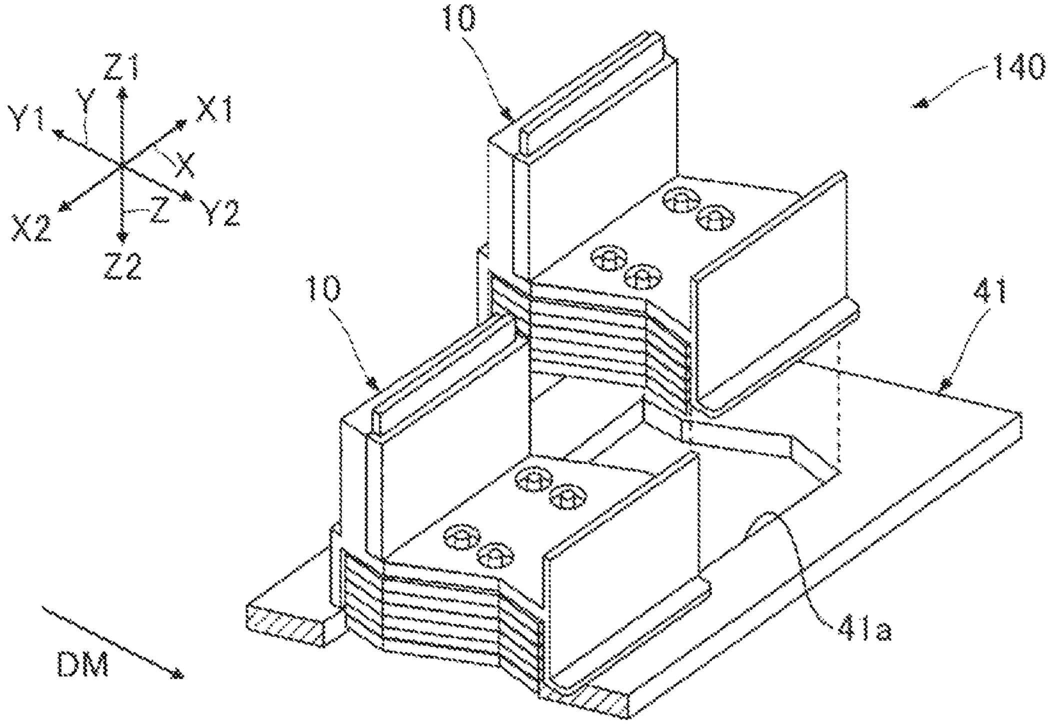
FIG. 3 is a perspective view of a liquid ejection module.

FIG. 3 is a perspective view of the liquid ejection module 140. As shown in FIG. 3, the liquid ejection module 140 includes a supporting body 41 and the plurality of liquid ejection heads 10. The supporting body 41 is a member that supports the plurality of liquid ejection heads 10. In an example shown in FIG. 3, the supporting body 41 is a plate-shaped member formed of metal or the like, and is provided with an attachment hole 41*a* for attachment of the plurality of liquid ejection heads 10. The plurality of liquid ejection heads 10 are inserted into the attachment hole 41*a* in a state of being arranged in the direction along the X-axis, and each liquid ejection head 10 is fixed to the supporting body 41 by being screwed or the like. In FIG. 3, two liquid ejection heads 10 are shown as representatives. The number of liquid ejection heads 10 of the liquid ejection module 140 can be any number. In addition, the shape and the like of the supporting body 41 are not limited to those in the example shown in FIG. 3, and any shape or the like can be adopted.

1-3. Liquid Ejection Head 10

Figure 4:
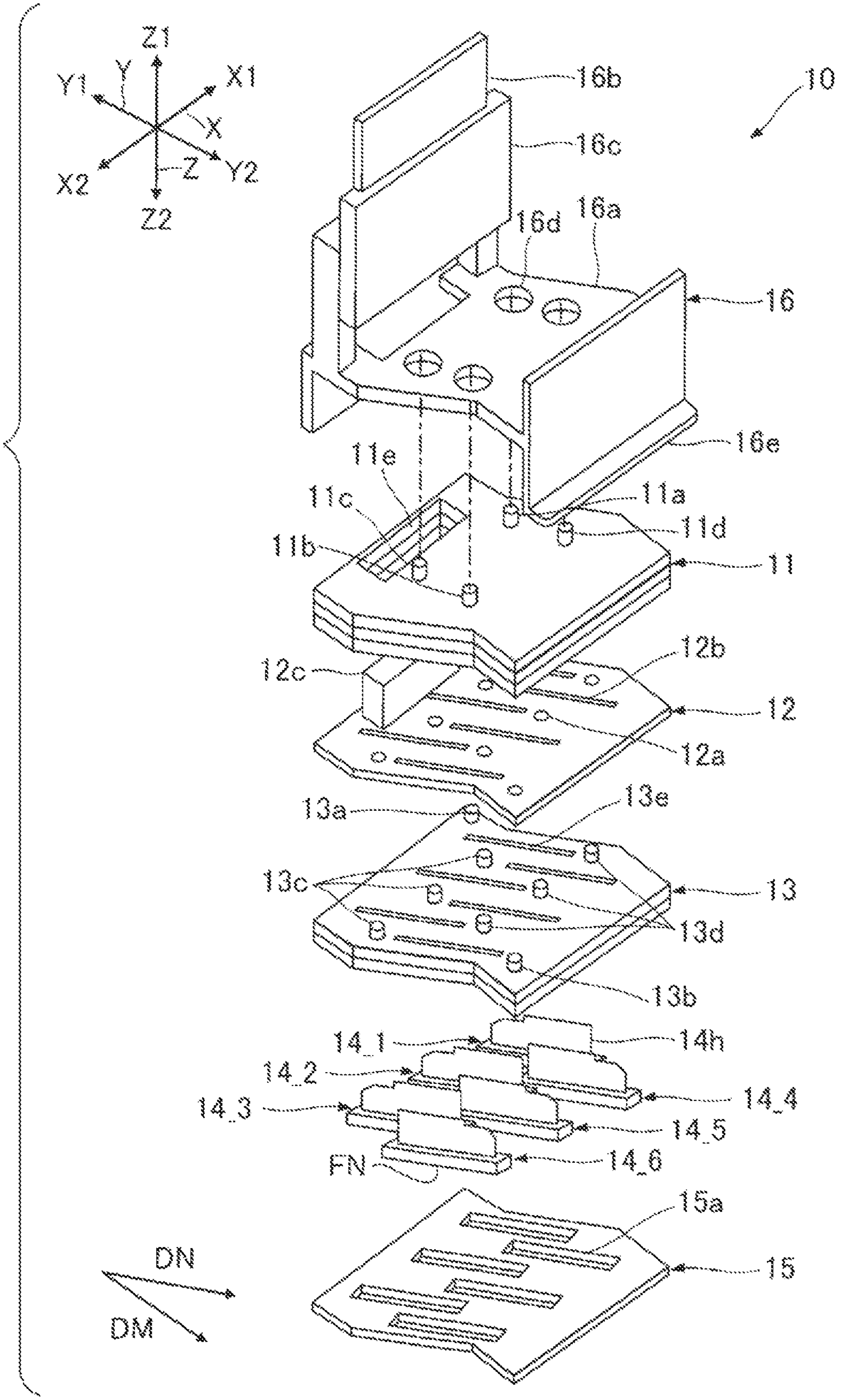
FIG. 4 is an exploded perspective view of a liquid ejection head shown in FIG. 3.

FIG. 4 is an exploded perspective view of the liquid ejection head 10 shown in FIG. 3. As shown in FIG. 4, the liquid ejection head 10 includes a flow path structure 11, a wiring substrate 12, a holder 13, six head main bodies 14_1, 14_2, 14_3, 14_4, 14_5, and 14_6, a fixation plate 15, and a base 16. The flow path structure 11, the wiring substrate 12, the holder 13, the six head main bodies 14_1, 14_2, 14_3, 14_4, 14_5, and 14_6, the fixation plate 15, and the base 16 are disposed in the order of the base 16, the flow path structure 11, the wiring substrate 12, the holder 13, the plurality of head main bodies 14_1, 14_2, 14_3, 14_4, 14_5, and 14_6, and the fixation plate 15 in the Z2 direction. Hereinafter, each part of the liquid ejection head 10 will be described in order. Note that, hereinafter, the head main bodies 14_1, 14_2, 14_3, 14_4, 14_5, and 14_6 may be collectively referred to as the head main bodies 14.

The flow path structure 11 is a structure in which a flow path used to cause ink to flow between the circulation mechanism 150 and the plurality of head main bodies 14 is provided. As shown in FIG. 4, the flow path structure 11 is provided with a coupling pipe 11*a*, a coupling pipe lib, a coupling pipe 11*c*, a coupling pipe lid, and a hole 11*e*.

Here, although not shown in the drawings, flow paths such as a first supply flow path CC1, a second supply flow path CC2, a first discharge flow path CM1, and a second discharge flow path CM2 are provided in the flow path structure 11. The first supply flow path CC1 is a flow path for supply of the first ink to the plurality of head main bodies 14, the first ink being introduced into the coupling pipe 11*a*. The second supply flow path CC2 is a flow path for supply of the second ink to the plurality of head main bodies 14 the, second ink being introduced into the coupling pipe lib. A filter used to capture foreign substances or the like is installed in an intermediate portion of each of the supply flow paths. The first discharge flow path CM1 is a flow path for discharge of the first ink from the plurality of head main bodies 14. The second discharge flow path CM2 is a flow path for discharge of the second ink from the plurality of head main bodies 14.

The coupling pipes 11*a*, 11*b*, 11*c*, and 11*d* are pipe bodies protruding in the Z1 direction. More specifically, the coupling pipe 11*a* is a pipe body that constitutes a flow path for supply of the first ink to the first supply flow path CC1. In addition, the coupling pipe 11*b* is a pipe body that constitutes a flow path for supply of the second ink to the second supply flow path CC2. Meanwhile, the coupling pipe 11*c* is a pipe body that constitutes a flow path for discharge of the first ink from the first discharge flow path CM1. In addition, the coupling pipe 11*d* is a pipe body that constitutes a flow path for discharge of the second ink from the second discharge flow path CM2. The hole 11*e* is a hole for insertion of a connector 12*c* which will be described later.

The wiring substrate 12 is a mounted component for electrical coupling between the plurality of head main bodies 14 and a collective substrate 16*b* which will be described later. The wiring substrate 12 is, for example, a rigid wiring substrate. The wiring substrate 12 is disposed between the flow path structure 11 and the holder 13, and the connector 12*c* is installed on a surface of the wiring substrate 12 that faces the flow path structure 11. The connector 12*c* is a coupling component coupled to the collective substrate 16*b* which will be described later. In addition, the wiring substrate 12 is provided with a plurality of holes 12*a* and a plurality of opening portions 12*b*. Each hole 12*a* is a hole for allowance of coupling between the flow path structure 11 and the holder 13. Each opening portion 12*b* is a hole through which a wiring substrate 14*h* that couples the head main body 14 and the wiring substrate 12 passes. The wiring substrate 14*h* is coupled to a surface of the wiring substrate 12 that faces the Z1 direction. The wiring substrate 14*h* is a member including a wire electrically coupled to a piezoelectric element PZ which will be described later, and is, for example, an FPC, a COF, an FFC, or the like. The "FPC" is an abbreviation for "Flexible Printed Circuits". The "COF" is an abbreviation for "Chip On Film". The "FFC" is an abbreviation for "Flexible Flat Cable".

The holder 13 is a structure that accommodates and supports the plurality of head main bodies 14. The holder 13 is formed of, for example, a resin material, a metal material, or the like. The holder 13 has a plate-like shape that extends in directions perpendicular to the Z-axis. In addition, the holder 13 is provided with a coupling pipe 13*a*, a coupling pipe 13*b*, a plurality of coupling pipes 13*c*, a plurality of coupling pipes 13*d*, and a plurality of wiring holes 13*e*. In addition, although not shown in the drawing, a surface of the holder 13 that faces the Z2 direction is provided with a plurality of recess portions for accommodation of the plurality of head main bodies 14.

In the first embodiment, the holder 13 holds the six head main bodies 14_1 to 14_6. The head main bodies 14 are arranged in the X2 direction in the order of the head main bodies 14_1, 14_2, 14_3, 14_4, 14_5, and 14_6. Here, the head main bodies 14_1 to 14_3 are disposed at positions offset from the head main bodies 14_4 to 14_6 in the Y1 direction. However, the head main bodies 14_1 to 14_6 partially overlap with each other as seen in the X1 direction or the X2 direction. In addition, arrangement directions DN (which will be described later) of the plurality of nozzles N of the head main bodies 14_1 to 14_6 are parallel to each other. Furthermore, each of the head main bodies 14_1 to 14_6 is disposed such that the arrangement direction DN is inclined with respect to the direction DM which is a transport direction of the medium PP.

Figure 8:
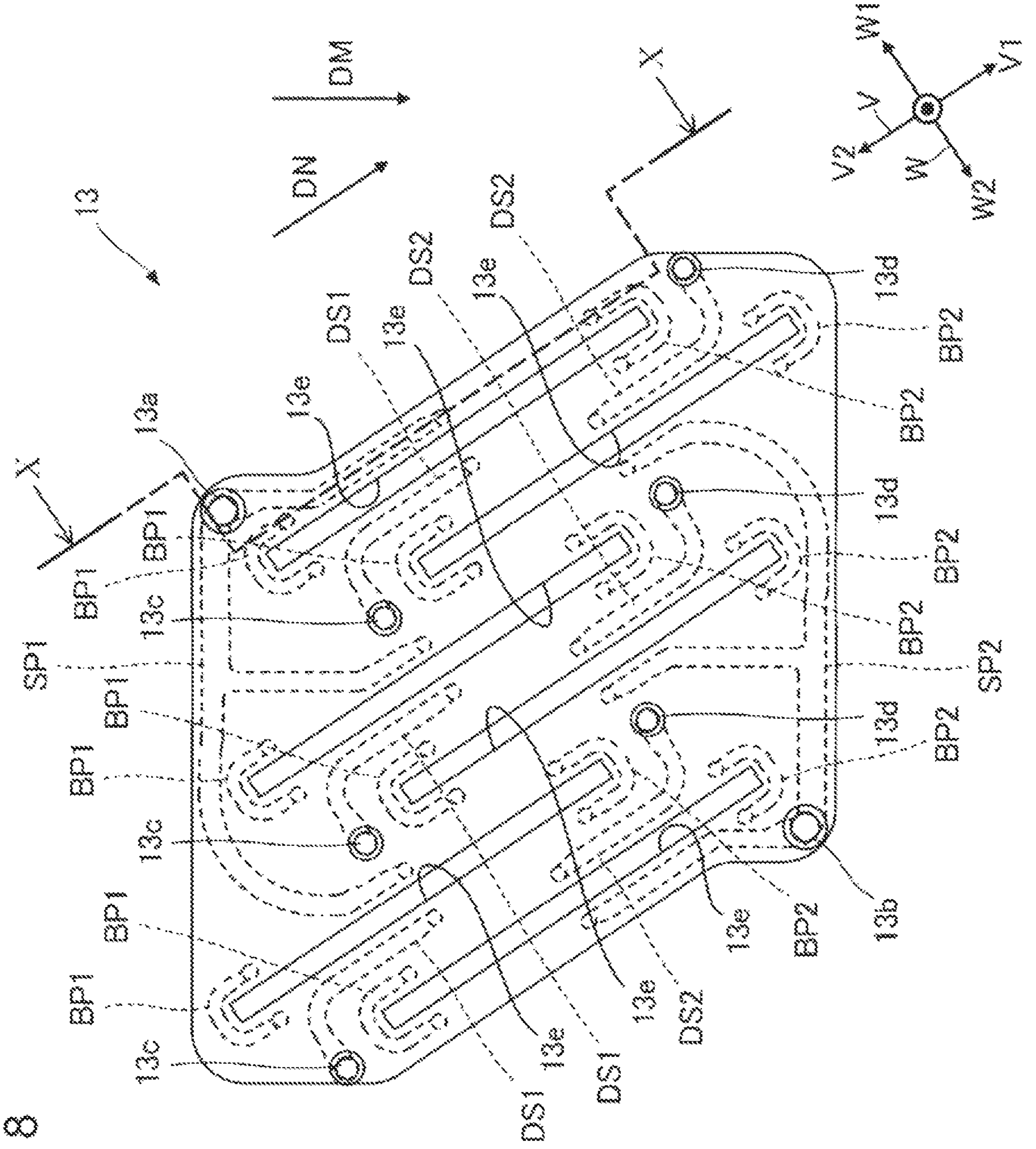
FIG. 8 is a plan view of a holder.
Figure 9:
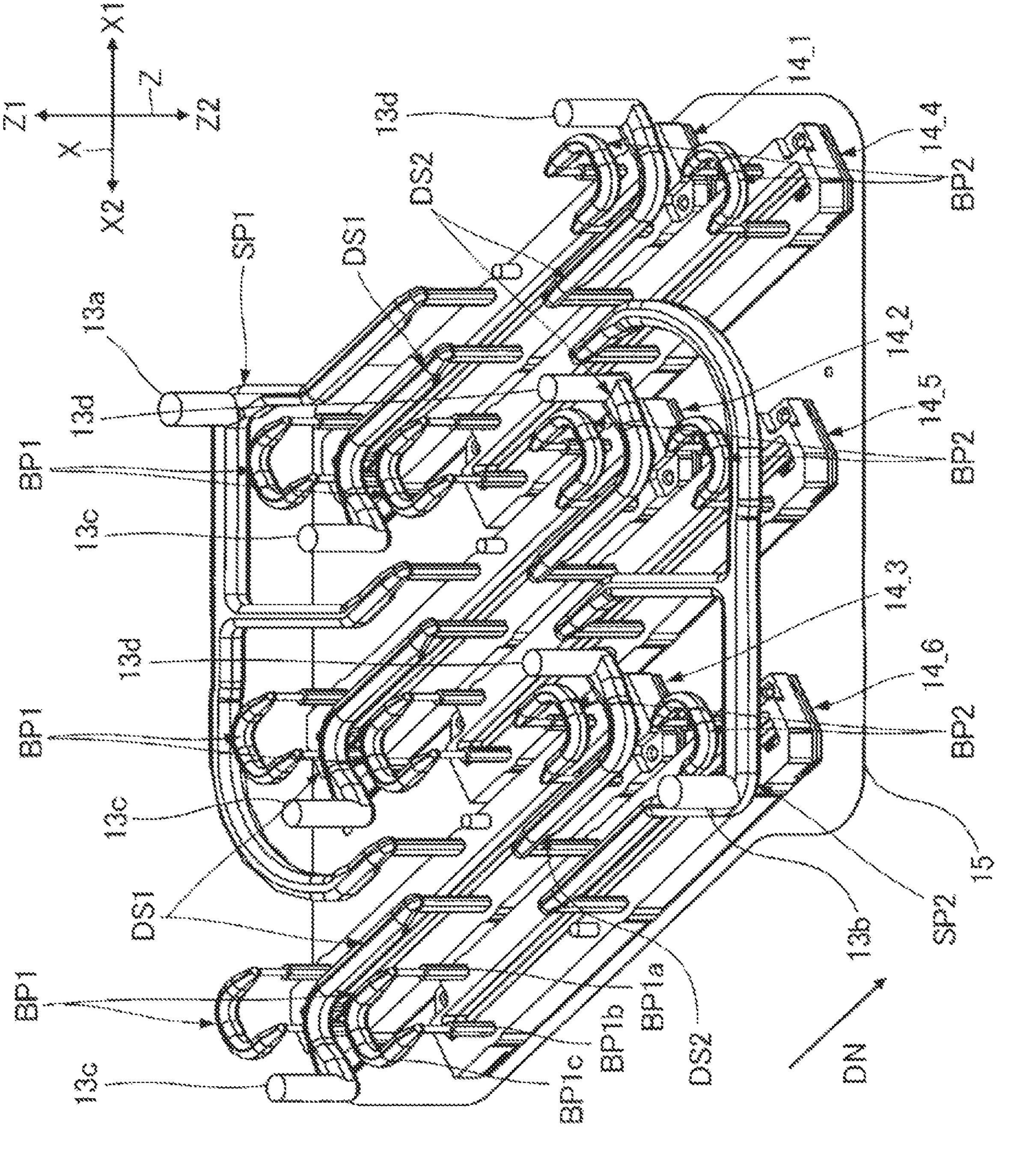
FIG. 9 is a perspective view showing flow paths provided in the holder and the head main bodies.

Here, although not shown in FIG. 4, a plurality of flow paths, which will be described later with reference to FIGS. 8 and 9, are provided inside the holder 13. The plurality of flow paths include a first distribution supply flow path SP1, a second distribution supply flow path SP2, a plurality of first individual discharge flow paths DS1, a plurality of second individual discharge flow paths DS2, and a plurality of bypass flow paths BP. The first distribution supply flow path SP1 is a flow path that includes branches for supply of the first ink to the plurality of head main bodies 14. The second distribution supply flow path SP2 is a flow path that includes branches for supply of the second ink to the plurality of head main bodies 14. The first individual discharge flow path DS1 is provided for each of the head main bodies 14 that discharge the first ink, and is a flow path for introduction of the first ink to the first discharge flow path CM1 of the flow path structure 11, the first ink being discharged from the head main bodies 14. The second individual discharge flow path DS2 is provided for each of the head main bodies 14 that discharge the second ink, and is a flow path for introduction of the second ink to the second discharge flow path CM2 of the flow path structure 11, the second ink being discharged from the head main bodies 14. Two bypass flow paths BP are provided for each of the head main bodies 14 and the bypass flow paths BP are bypass flow paths through which a first common liquid chamber R1 and a second common liquid chamber R2 (which will be described later) communicate with each other. Note that, the flow paths of the holder 13 will be described based on FIGS. 8 to 10 which will be used for description later.

In the first embodiment, regarding the head main bodies 14_1 to 14_6, the first ink is supplied to the head main bodies 14_1 to 14_3 and the second ink is supplied to the head main bodies 14_4 to 14_6.

The coupling pipes 13*a*, 13*b*, 13*c*, and 13*d* are pipe-shaped protrusions protruding in the Z1 direction. More specifically, the coupling pipe 13*a* is a pipe body that constitutes a flow path for supply of the first ink to the first distribution supply flow path SP1, and the coupling pipe 13*a* communicates with the first supply flow path CC1 of the flow path structure 11. In addition, the coupling pipe 13*b* is a pipe body that constitutes a flow path for supply of the second ink to the second distribution supply flow path SP2, and the coupling pipe 13*b* communicates with the second supply flow path CC2 of the flow path structure 11. Meanwhile, the coupling pipes 13*c* are pipe bodies that constitute flow paths for discharge of the first ink from the first individual discharge flow paths DS1 and the coupling pipes 13*c* communicate with the first discharge flow path CM1 of the flow path structure 11. In addition, the coupling pipes 13*d* are pipe bodies that constitute flow paths for discharge of the second ink from the second individual discharge flow paths DS2 and the coupling pipes 13*d* communicate with the second discharge flow path CM2 of the flow path structure 11. The wiring holes 13*e* are holes through which the wiring substrates 14*h* that couple the head main bodies 14 and the wiring substrate 12 pass.

Each head main body 14 ejects ink. Specifically, although not shown in FIG. 4, each head main body 14 includes M nozzles N for ejection of the first ink or the second ink. The nozzles N are provided in the nozzle surface FN, which is a surface of each head main body 14 that faces the Z2 direction. Details of the head main body 14 will be described based on FIG. 6 which will be used for description later.

The fixation plate 15 is a plate member for fixation of the plurality of head main bodies 14 to the holder 13. Specifically, the fixation plate 15 is disposed in a state where the plurality of head main bodies 14 are interposed between the fixation plate 15 and the holder 13, and is fixed to the holder 13 by means of an adhesive. The fixation plate 15 is formed of, for example, a metal material. The fixation plate 15 is provided with a plurality of opening portions 15*a* for exposure of the nozzles N of the plurality of head main bodies 14. In an example shown in FIG. 4, the plurality of opening portions 15*a* are provided such that the opening portion 15*a* is provided for each of the head main bodies 14. Note that, the opening portion 15*a* may be shared by two or more head main bodies 14.

The base 16 is a member for fixation of the flow path structure 11, the wiring substrate 12, the holder 13, the plurality of head main bodies 14, and the fixation plate 15 to the above-described supporting body 41. The base 16 includes a main body 16*a*, a collective substrate 16*b*, and a cover 16*c*.

The main body 16*a* is fixed to the holder 13 by being screwed or the like so that the flow path structure 11 and the wiring substrate 12 disposed between the base 16 and the holder 13 are held by the main body 16*a*. The main body 16*a* is formed of, for example, a resin material. The main body 16*a* includes a plate-shaped portion that faces a plate-shaped portion of the above-described flow path structure 11 and the plate-shaped portion is provided with a plurality of holes 16*d* into which the above-described coupling pipes 11*a*, 11*b*, 11*c*, and 11*d* are inserted. In addition, the main body 16*a* includes a portion that extends in the Z2 direction from the plate-shaped portion, and a tip end of that portion is provided with a flange 16*e* for fixation to the above-described supporting body 41.

The collective substrate 16*b* is a mounted component for electrical coupling between the control module 120 and the above-described wiring substrate 12. The collective substrate 16*b* is, for example, a rigid wiring substrate. The cover 16*c* is a plate-shaped member for protection of the collective substrate 16*b* and for fixation of the collective substrate 16*b* to the main body 16*a*. The cover 16*c* is formed of, for example, a resin material or the like, and the cover 16*c* is fixed to the main body 16*a* by being screwed or the like.

1-4. Head Main Body 14

Figure 5:
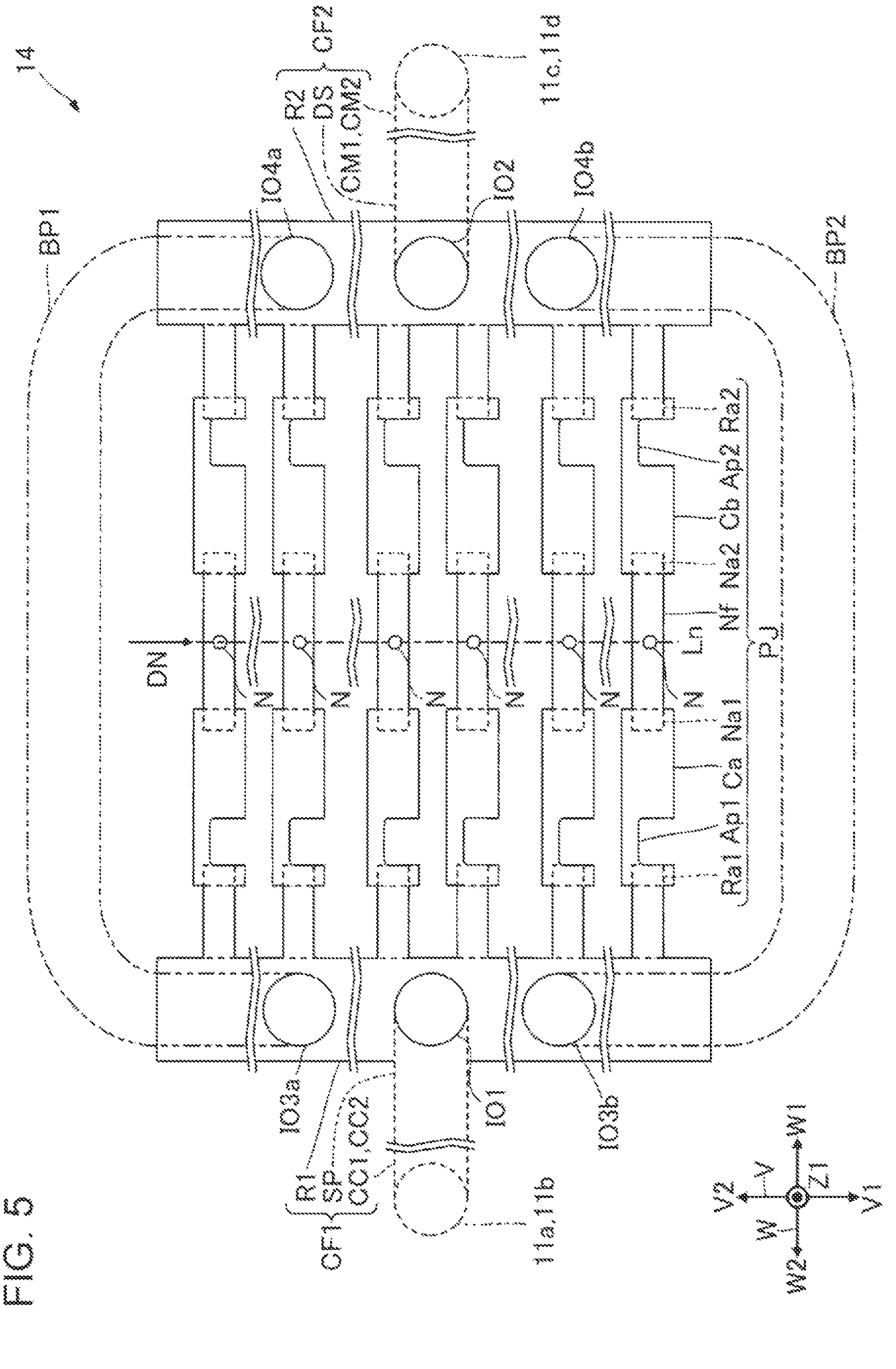
FIG. 5 is a plan view schematically showing flow paths of a head main body.

FIG. 5 is a plan view schematically showing flow paths of the head main body 14. For the sake of convenience, the following description will be made while appropriately using a V-axis and a W-axis in addition to the X-axis, the Y-axis, and the Z-axis. In addition, a direction extending along the V-axis is a V1 direction, and a direction opposite to the V1 direction is a V2 direction. Similarly, directions that extend along the W-axis and are opposite to each other are a W1 direction and a W2 direction.

Here, the V-axis is an axis along the arrangement direction DN of the plurality of nozzles N, which will be described later, and is an axis obtained by rotating the Y-axis around the Z-axis by a predetermined angle. The W-axis is an axis obtained by rotating the X-axis around the Z-axis by the predetermined angle. Therefore, the V-axis and the W-axis are typically orthogonal to each other. However, the present disclosure is not limited thereto. For example, the V-axis and the W-axis only need to intersect each other at an angle within a range of 80 degrees or more and 100 degrees or less. In addition, the predetermined angle (that is, the angle formed between the V-axis and the Y-axis, or the angle formed between the W-axis and the X-axis) is, for example, in a range of 40 degrees or more and 60 degrees or less.

As shown in FIG. 5, the head main body 14 is provided with M nozzles N, M individual flow paths PJ, the first common liquid chamber R1, and the second common liquid chamber R2. Here, the first common liquid chamber R1 and the second common liquid chamber R2 communicate with each other via the M individual flow paths PJ. In addition, as represented by two-dot chain lines in FIG. 5, the bypass flow paths BP1 and BP2 are coupled to the first common liquid chamber R1 and the second common liquid chamber R2. Hereinafter, the bypass flow paths BP1 and BP2 may be collectively referred to as the bypass flow paths BP. The bypass flow paths BP1 and BP2 are flow paths that bypass the M individual flow paths PJ and through which the first common liquid chamber R1 and the second common liquid chamber R2 communicate with each other, the bypass flow paths BP1 and BP2 being provided in the holder 13. Ink supplied to the first common liquid chamber R1 flows into any one of the M individual flow paths PJ and the bypass flow paths BP1 and BP2. Ink not ejected from the respective nozzles N of the M individual flow paths PJ and ink flowing through the bypass flow paths BP1 and BP2 are discharged to the second common liquid chamber R2. The flow path resistance of the bypass flow paths BP is smaller than the flow path resistance of each of the M individual flow paths PJ. Since the liquid ejection head 10 includes the bypass flow paths BP, the liquid ejection head 10 can retrieve air bubbles in ink. Details of the bypass flow paths BP1 and BP2 will be described based on FIGS. 8, 9, and 10 which will be used for description later.

The head main body 14 includes a surface that faces the medium PP, and as shown in FIG. 5, the surface is provided with the M nozzles N. The plurality of nozzles N are arranged along the V-axis. Each of the M nozzles N ejects ink in the Z2 direction.

Here, a group of the plurality of nozzles N constitutes a nozzle row Ln. Further, the plurality of nozzles N are arranged at substantially equal intervals at a predetermined pitch. The predetermined pitch is a distance between the centers of the plurality of nozzles N in a direction along the V-axis.

The individual flow path PJ communicates with each of the M nozzles N. The M individual flow paths PJ extend along the W-axis and communicate with different nozzles N. The M individual flow paths PJ are arranged along the V-axis.

As shown in FIG. 5, each of the M individual flow paths PJ includes a pressure chamber Ca, a pressure chamber Cb, a nozzle flow path Nf, an individual supply flow path Ra1, an individual discharge flow path Ra2, a first communication flow path Na1, a second communication flow path Na2, a narrowed portion Ap1, and a narrowed portion Ap2.

Each of the pressure chamber Ca and the pressure chamber Cb in any of the M individual flow paths PJ is a space that extends along the W-axis and in which ink to be ejected from the nozzle N communicating with the individual flow path PJ is stored. In an example shown in FIG. 5, M pressure chambers Ca are arranged along the V-axis. Similarly, M pressure chambers Cb are arranged along the V-axis. Note that, in each of the M individual flow paths PJ, the positions of the pressure chamber Ca and the pressure chamber Cb in the direction along the V-axis are the same as each other in the example shown in FIG. 5. However, the positions thereof in the direction along the V-axis may be different from each other. Note that, hereinafter, when the pressure chamber Ca and the pressure chamber Cb are not to be particularly distinguished, each of the pressure chamber Ca and the pressure chamber Cb may be collectively referred to as a "pressure chamber C".

The nozzle flow path Nf is disposed between the pressure chamber Ca and the pressure chamber Cb in each of the M individual flow paths PJ. Here, the pressure chamber Ca communicates with the nozzle flow path Nf via the first communication flow path Na1 extending along the Z-axis. The pressure chamber Cb communicates with the nozzle flow path Nf via the second communication flow path Na2 extending along the Z-axis.

In the M individual flow paths PJ, the nozzle flow paths Nf are spaces extending along the W-axis. In addition, M nozzle flow paths Nf are arranged at intervals along the V-axis. Each of the M nozzle flow paths Nf is provided with the nozzle N. Ink is ejected from the nozzle N in each of the M nozzle flow paths Nf when there is a change in pressures in the pressure chamber Ca and the pressure chamber Cb.

Each of the first communication flow path Na1 and the second communication flow path Na2 is a space extending along the Z-axis.

Here, the first common liquid chamber R1 and the second common liquid chamber R2 communicate with the M individual flow paths PJ. The pressure chamber Ca communicates with the first common liquid chamber R1 via the narrowed portion Ap1 extending along the W-axis and the individual supply flow path Ra1 extending along the Z-axis. The pressure chamber Cb communicates with the second common liquid chamber R2 via the narrowed portion Ap2 extending along the W-axis and the individual discharge flow path Ra2 extending along the Z-axis.

The narrowed portion Ap1 is a flow path provided between the pressure chamber Ca and the individual supply flow path Ra1. The narrowed portion Ap2 is a flow path provided between the pressure chamber Cb and the individual discharge flow path Ra2. Hereinafter, each of the narrowed portion Ap1 and the narrowed portion Ap2 may be collectively referred to as a "narrowed portion Ap". The narrowed portions Ap are flow paths formed to be narrower than other regions in the individual flow path PJ. The other regions in the individual flow path PJ are the pressure chamber Ca and the pressure chamber Cb. More specifically, the cross-sectional area of the narrowed portion Ap1 is smaller than the cross-sectional area of the pressure chamber Ca. Therefore, the narrowed portion Ap1 has a higher flow path resistance than the pressure chamber Ca. Similarly, the cross-sectional area of the narrowed portion Ap2 is smaller than the cross-sectional area of the pressure chamber Cb. Therefore, the narrowed portion Ap2 has a higher flow path resistance than the pressure chamber Cb. Furthermore, the narrowed portions Ap may be formed to be narrower than all other regions in the individual flow path PJ. The all other regions in the individual flow path PJ are the pressure chamber Ca, the pressure chamber Cb, the nozzle flow path Nf, the individual supply flow path Ra1, the individual discharge flow path Ra2, the first communication flow path Na1, and the second communication flow path Na2. Since the narrowed portions Ap are formed to be narrower than the other regions in the individual flow path PJ, the flow path resistances of the narrowed portions Ap are set to be higher than that of the other regions in the individual flow path PJ.

Each of the first common liquid chamber R1 and the second common liquid chamber R2 is a space that extends along the V-axis to overlap with the M individual flow paths PJ as seen along the W-axis. The first common liquid chamber R1 is coupled to an end, in the W2 direction, of each of the M individual flow paths PJ. In the first common liquid chamber R1, ink to be supplied to the plurality of individual flow paths PJ is stored. Meanwhile, the second common liquid chamber R2 is coupled to ends, in the W1 direction, of the individual flow paths PJ. In the second common liquid chamber R2, ink that is discharged from the plurality of individual flow paths PJ without being ejected from the nozzles N is stored.

The first common liquid chamber R1 is provided with a supply port IO1, a discharge port IO3*a*, and a discharge port IO3*b*. The supply port IO1 is a pipeline for introduction of ink into the first common liquid chamber R1 from a distribution supply flow path SP of the holder 13. The discharge port IO3*a* is a pipeline for discharge of ink from the first common liquid chamber R1 to the bypass flow path BP1. The discharge port IO3*b* is a pipeline for discharge of ink from the first common liquid chamber R1 to the bypass flow path BP2. Note that, the distribution supply flow path SP is a general term for the first distribution supply flow path SP1 or the second distribution supply flow path SP2, which will be described later.

Here, the distribution supply flow path SP is coupled to the circulation mechanism 150 via the first supply flow path CC1 or the second supply flow path CC2 of the flow path structure 11. Therefore, a flow path from the coupling pipe 11*a* or the coupling pipe 11*b* to the first common liquid chamber R1 is provided in common for the M pressure chambers Ca and the flow path constitutes a common supply flow path CF1 for supply of ink to the M individual flow paths PJ.

The second common liquid chamber R2 is provided with a discharge port 102, an introduction port IO4*a*, and an introduction port IO4*b*. The discharge port 102 is a pipeline for discharge of ink from the second common liquid chamber R2 to an individual discharge flow path DS of the holder 13. The introduction port IO4*a* is a pipeline for introduction of ink from the bypass flow path BP1 into the second common liquid chamber R2. The introduction port IO4*b* is a pipeline for introduction of ink from the bypass flow path BP2 into the second common liquid chamber R2. Note that, the individual discharge flow path DS is the first individual discharge flow path DS1 or the second individual discharge flow path DS2, which will be described later.

Here, the individual discharge flow path DS is coupled to the circulation mechanism 150 via the first discharge flow path CM1 or the second discharge flow path CM2 of the flow path structure 11. Therefore, a flow path from the second common liquid chamber R2 to the coupling pipe 11*a* or the coupling pipe 11*b* is provided in common for the M pressure chambers Cb and the flow path constitutes a common discharge flow path CF2 for discharge of ink from the M individual flow paths PJ.

Figure 6:
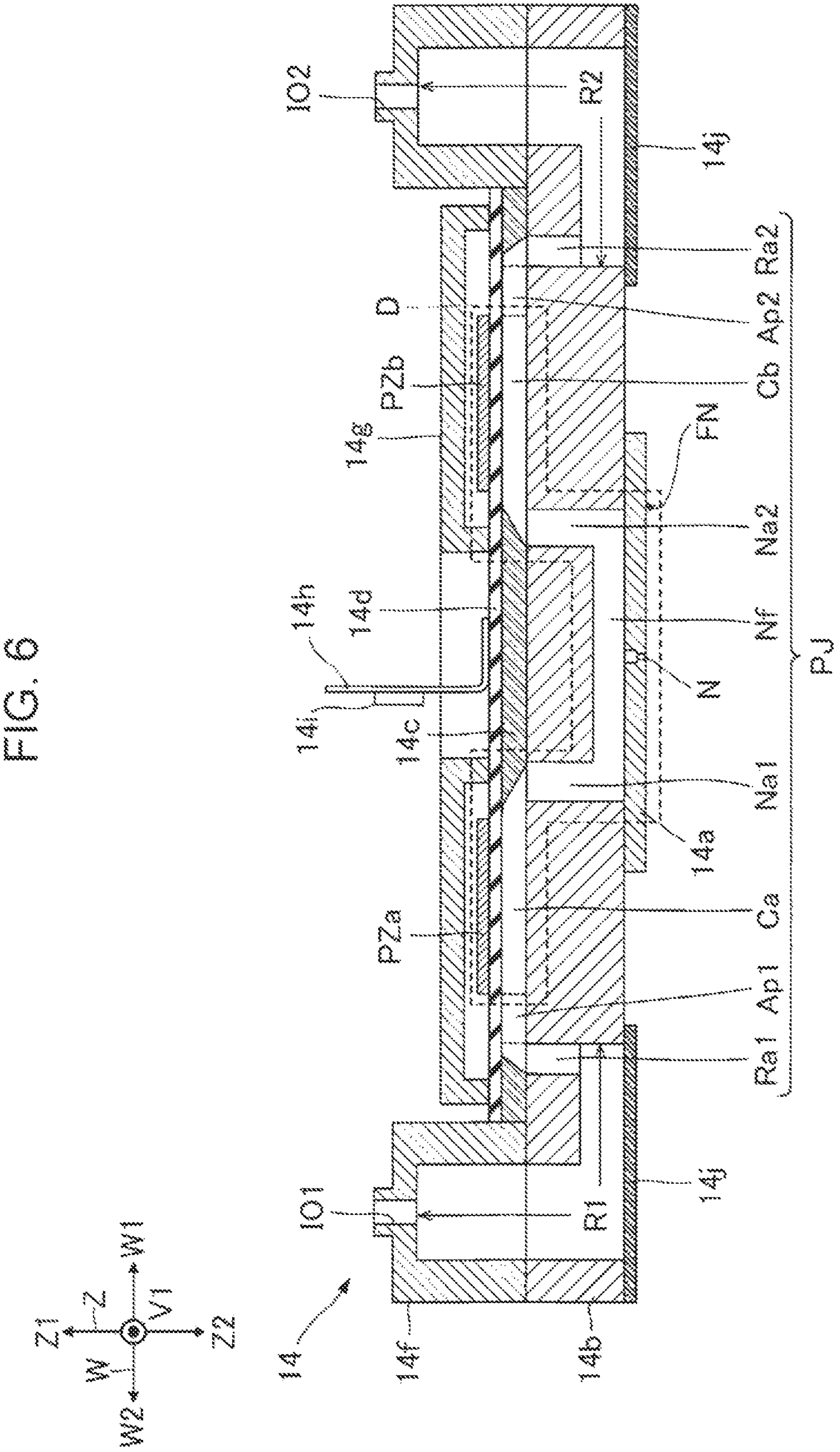
FIG. 6 is a cross-sectional view of the head main body.

FIG. 6 is a cross-sectional view of the head main body 14. FIG. 6 shows a cross section of the head main body 14 cut by a plane including the W-axis and the Z-axis. As shown in FIG. 6, the head main body 14 includes a nozzle substrate 14*a*, a flow path substrate 14*b*, a pressure chamber substrate 14*c*, a vibration plate 14*d*, 2×M piezoelectric elements PZ, a case 14*f*, a protection plate 14*g*, the wiring substrate 14*h*, and a vibration absorbing body 14*j*.

The nozzle substrate 14*a*, the flow path substrate 14*b*, the pressure chamber substrate 14*c*, and the vibration plate 14*d* are stacked in this order in the Z1 direction. Each of these members extends along the V-axis and is manufactured, for example, by processing a silicon single crystal substrate with a semiconductor processing technology. In addition, these members are bonded to each other by means of an adhesive or the like. Note that, another layer such as an adhesive layer or a substrate may be appropriately interposed between two of these members that are adjacent to each other.

The nozzle substrate 14*a* is provided with the M nozzles N. Each of the M nozzles N is a through-hole that penetrates the nozzle substrate 14*a* and through which ink passes. The M nozzles N are arranged in the direction along the V-axis.

The flow path substrate 14*b* is provided with a portion of each of the first common liquid chamber R1 and the second common liquid chamber R2 and is provided with portions of the M individual flow paths PJ excluding the pressure chambers Ca, the narrowed portions Ap1, the pressure chambers Cb, and the narrowed portions Ap2. That is, the flow path substrate 14*b* is provided with the nozzle flow paths Nf, the first communication flow paths Na1, the second communication flow paths Na2, the individual supply flow paths Ra1, and the individual discharge flow paths Ra2.

The portion of each of the first common liquid chamber R1 and the second common liquid chamber R2 is a space penetrating the flow path substrate 14*b*. The vibration absorbing body 14*j* that closes an opening attributable to the space is installed on a surface of the flow path substrate 14*b* that faces the Z2 direction.

The vibration absorbing body 14*j* is a layer-shaped member formed of an elastic material. The vibration absorbing body 14*j* constitutes a portion of a wall surface of each of the first common liquid chamber R1 and the second common liquid chamber R2, and absorbs a pressure change in the first common liquid chamber R1 and the second common liquid chamber R2.

The nozzle flow paths Nf are spaces in grooves provided at a surface of the flow path substrate 14*b* that faces the Z2 direction. Here, the nozzle substrate 14*a* constitutes portions of wall surfaces of the nozzle flow paths Nf.

Each of the first communication flow paths Na1 and the second communication flow paths Na2 is a space penetrating the flow path substrate 14*b*.

Each of the individual supply flow paths Ra1 and the individual discharge flow paths Ra2 is a space penetrating the flow path substrate 14*b*. The first common liquid chamber R1 and the narrowed portions Ap1 communicate with each other through the individual supply flow paths Ra1 and ink from the first common liquid chamber R1 is supplied to the pressure chambers Ca via the narrowed portions Ap1. Here, one end of each individual supply flow path Ra1 is open at a surface of the flow path substrate 14*b* that faces the Z1 direction. Meanwhile, the other end of each individual supply flow path Ra1 is an upstream end of the individual flow path PJ and is open at the wall surface of the first common liquid chamber R1 in the flow path substrate 14*b*. With regard to this, the second common liquid chamber R2 and the narrowed portions Ap2 communicate with each other through the individual discharge flow paths Ra2 and ink from the pressure chambers Cb that is discharged via the narrowed portions Ap2 is discharged to the second common liquid chamber R2 through the individual discharge flow paths Ra2. Here, one end of each individual discharge flow path Ra2 is open at a surface of the flow path substrate 14*b* that faces the Z1 direction. Meanwhile, the other end of each individual discharge flow path Ra2 is a downstream end of the individual flow path PJ and is open at the wall surface of the second common liquid chamber R2 in the flow path substrate 14*b*.

The pressure chamber substrate 14*c* is provided with the pressure chamber Ca, the narrowed portion Ap1, the pressure chamber Cb, and the narrowed portion Ap2 of each of the M individual flow paths PJ. Each of the pressure chamber Ca, the narrowed portion Ap1, the pressure chamber Cb, and the narrowed portion Ap2 penetrates the pressure chamber substrate 14*c* and is a gap between the flow path substrate 14*b* and the vibration plate 14*d*.

The vibration plate 14*d* is a plate-shaped member that can elastically vibrate. The vibration plate 14*d* is, for example, a laminated body including a first layer formed of silicon oxide and a second layer formed of zirconium oxide. Here, another layer such as a metal oxide layer may be interposed between the first layer and the second layer. Note that, a portion of the vibration plate 14*d* or the entire vibration plate 14*d* may be integrally formed with the pressure chamber substrate 14*c* while being formed of the same material as the pressure chamber substrate 14*c*. For example, the vibration plate 14*d* and the pressure chamber substrate 14*c* can be integrally formed with each other by selectively removing portions, in a thickness direction, of regions of a plate-shaped member having a predetermined thickness, the regions corresponding to the pressure chambers C. In addition, the vibration plate 14*d* may be composed of a single-material layer.

On a surface of the vibration plate 14*d* that faces the Z1 direction, M piezoelectric elements PZa respectively corresponding to the M pressure chambers Ca and M piezoelectric elements PZb respectively corresponding to the M pressure chambers Cb are installed. In the following description, "piezoelectric element PZ" is a general term for the piezoelectric elements PZa and the piezoelectric elements PZb. In addition, the piezoelectric element PZ corresponding to the pressure chamber C means the piezoelectric element PZ that overlaps a portion of the pressure chamber C or the entire pressure chamber C in plan view along the Z-axis.

Figure 7:
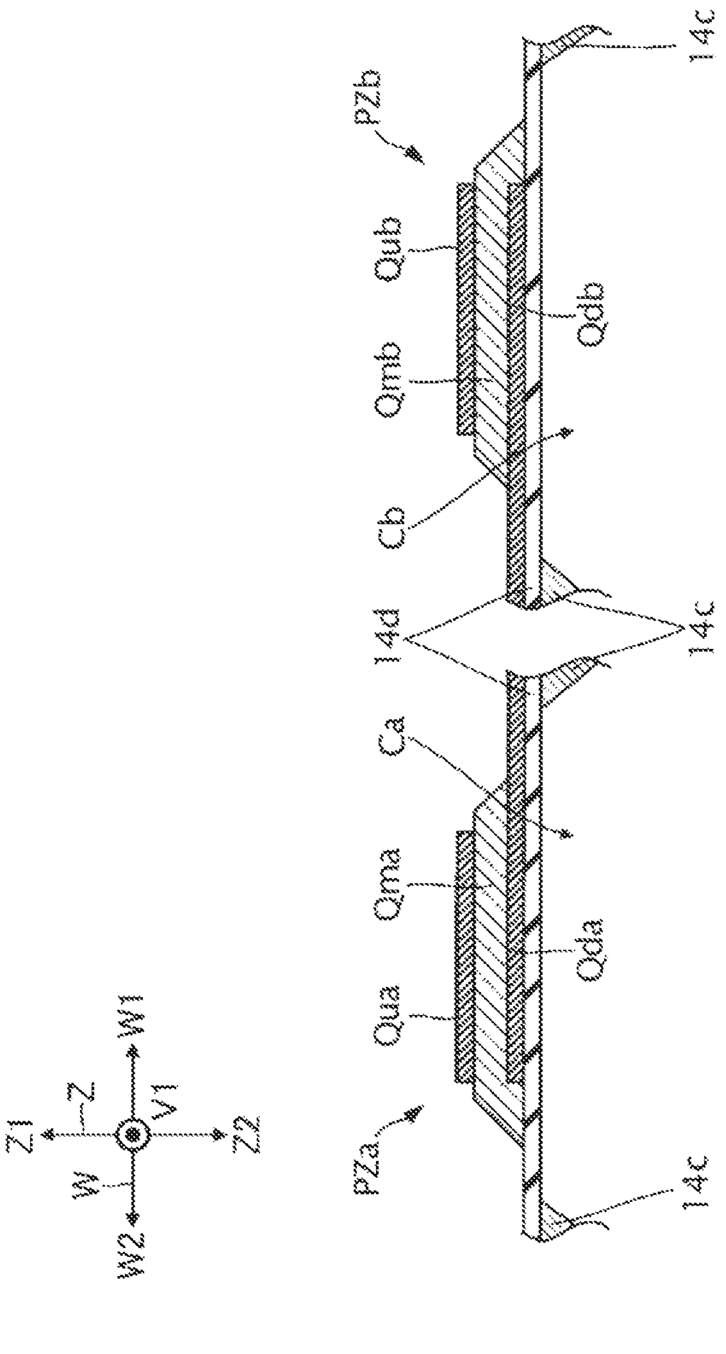
FIG. 7 is an enlarged view of the vicinities of piezoelectric elements of FIG. 6.

FIG. 7 is an enlarged view of the vicinities of the piezoelectric elements PZ of FIG. 6. As shown in FIG. 7, the M piezoelectric elements PZa are formed by stacking a common electrode Qua and individual electrodes Qda that face each other and piezoelectric bodies Qma that are disposed between the common electrode Qua and the individual electrodes Qda. The common electrode Qua is provided in common for the M pressure chambers Ca. The individual electrodes Qda are respectively provided for the M pressure chambers Ca. Similarly, the M piezoelectric elements PZb are formed by stacking a common electrode Qub and individual electrodes Qdb that face each other and piezoelectric bodies Qmb that are disposed between the common electrode Qub and the individual electrodes Qdb. The common electrode Qub is provided in common for the M pressure chambers Cb. The individual electrodes Qdb are respectively provided for the M pressure chambers Cb.

As shown in FIG. 7, the common electrode Qua is provided on surfaces of the piezoelectric bodies Qma that face the Z1 direction. The common electrode Qub is provided on surfaces of the piezoelectric bodies Qmb that face the Z1 direction. In the following description, each of the common electrode Qua and the common electrode Qub may be collectively referred to as a common electrode Qu. The individual electrodes Qda are provided on surfaces of the piezoelectric bodies Qma that face the Z2 direction. The individual electrodes Qdb are provided on surfaces of the piezoelectric bodies Qmb that face the Z2 direction. In the following description, each of the individual electrodes Qda and the individual electrodes Qdb may be collectively referred to as an individual electrode Qd. A predetermined reference potential Vbs is supplied to the common electrodes Qu, and the drive signal Com is supplied to the individual electrodes Qd. In the first embodiment, the common electrodes Qu are so-called upper electrodes, and the individual electrodes Qd are so-called lower electrodes. A configuration in which the common electrodes Qu are lower electrodes and the individual electrodes Qd are upper electrodes may also be adopted.

Each of the 2×M piezoelectric elements PZ causes a change in pressure of ink in the pressure chamber C corresponding thereto so that the ink in the pressure chamber C is ejected from the nozzle N. The piezoelectric elements PZ causes the vibration plate 14*d* to vibrate in accordance with deformation thereof when the drive signal Com is supplied thereto. Because of the vibration, the pressure chambers C expand and contract and thus the pressure of ink in the pressure chambers C changes.

The description will be made referring again to FIG. 6. The case 14*f* is a case for storage of ink. The case 14*f* is provided with a space constituting a remaining portion of each of the first common liquid chamber R1 and the second common liquid chamber R2 other than a portion provided in the flow path substrate 14*b*.

The protection plate 14*g* is a plate-shaped member installed on the surface of the vibration plate 14*d* that faces the Z1 direction, protects the 2×M piezoelectric elements PZ, and reinforces the mechanical strength of the vibration plate 14*d*. Here, a space for accommodation of the 2×M piezoelectric elements PZ is formed between the protection plate 14*g* and the vibration plate 14*d*.

The wiring substrate 14*h* is mounted on the surface of the vibration plate 14*d* that faces the Z1 direction, and is a mounted component for electrical coupling between the control module 120 and the head main body 14. A drive circuit 14*i* is mounted on the wiring substrate 14*h*. The drive circuit 14*i* includes the switching circuit 141 shown in FIG. 1.

In the head main body 14 configured as described above, because of the operation of the circulation mechanism 150, ink flows through the first common liquid chamber R1, the individual supply flow paths Ra1, the narrowed portions Ap1, the pressure chambers Ca, the first communication flow paths Na1, the nozzle flow paths Nf, the second communication flow paths Na2, the pressure chambers Cb, the narrowed portions Ap2, the individual discharge flow paths Ra2, and the second common liquid chamber R2 in this order.

As shown in FIG. 6, one ejector D includes two piezoelectric elements PZ, two pressure chambers C, and one nozzle N. When the drive signal Com is supplied to the two piezoelectric elements PZ based on the designation signal SI, the ejector D drives the two piezoelectric elements PZ by means of the drive signal Com so that ink in the two pressure chambers C is ejected from the nozzle N. In the following description, two piezoelectric elements PZ included in the ejector D[m] may be described as "piezoelectric elements PZ[m]", with respect to any m ranging from 1 to M. Further, the individual electrodes Qd respectively provided in the two piezoelectric elements PZ may be described as "individual electrodes Qd[m]". The individual flow path PJ corresponding to the ejector D[m] (in other words, the individual flow path PJ including a pressure chamber Ca[m] and a pressure chamber Cb[m]) may be described as an "individual flow path PJ[m]". In addition, each element in the individual flow path PJ may be described with a suffix "[m]" added thereto.

An individual flow path PJ[m1] of a certain head main body 14 is an example of a "first individual flow path", with respect to any integer m1 ranging from 1 to M. A pressure chamber Ca[m1] included in the individual flow path PJ[m1] is an example of a "first pressure chamber", and a piezoelectric element PZa[m1] is an example of a "first piezoelectric element". A pressure chamber Cb[m1] included in the individual flow path PJ[m1] is an example of a "second pressure chamber", and a piezoelectric element PZb[m1] is an example of a "second piezoelectric element". A nozzle N[m1] communicating with the individual flow path PJ[m1] is an example of a "first nozzle". A narrowed portion Ap1[m1] included in the individual flow path PJ[m1] is an example of a "first narrowed portion". A narrowed portion Ap2 [m1] included in the individual flow path PJ[m1] is an example of a "second narrowed portion".

An individual flow path PJ[m2] is an example of a "second individual flow path", with respect to an integer m2 different from the integer m1 in a range from 1 to M. A pressure chamber Ca[m2] included in the individual flow path PJ[m2] is an example of a "third pressure chamber", and a piezoelectric element PZa[m2] is an example of a "third piezoelectric element". A pressure chamber Cb[m2] included in the individual flow path PJ[m2] is an example of a "fourth pressure chamber", and a piezoelectric element PZb[m2] is an example of a "fourth piezoelectric element". A nozzle N[m2] communicating with the individual flow path PJ[m2] is an example of a "second nozzle". A narrowed portion Ap1[m2] included in the individual flow path PJ[m2] is an example of a "third narrowed portion". A narrowed portion Ap2[m2] included in the individual flow path PJ[m2] is an example of a "fourth narrowed portion".

1-5. Holder 13

FIG. 8 is a plan view of the holder 13. FIG. 9 is a perspective view showing the flow paths provided in the holder 13 and the head main bodies 14. Note that, in FIG. 8, an example of the internal structure of the holder 13 as seen in the Z2 direction is shown by broken lines. In FIG. 9, the fixation plate 15 is shown in addition to the flow paths of the holder 13 and the plurality of head main bodies 14.

As shown in FIGS. 8 and 9, in the holder 13, the first distribution supply flow path SP1, the second distribution supply flow path SP2, three first individual discharge flow paths DS1, three second individual discharge flow paths DS2, six bypass flow paths BP1, and six bypass flow paths BP2 are provided.

The first distribution supply flow path SP1 is a flow path including three branch portions for supply of the first ink to three head main bodies 14, the first ink being introduced into the coupling pipe 13*a*. The second distribution supply flow path SP2 is a flow path including three branch portions for supply of the second ink to three head main bodies 14, the second ink being introduced into the coupling pipe 13*b*.

The first individual discharge flow path DS1 is provided for each of the head main bodies 14 that use the first ink, and is a flow path for discharge of the first ink from the coupling pipe 13*c*, the first ink being introduced from the corresponding head main body 14. The second individual discharge flow path DS2 is provided for each of the head main bodies 14 that use the second ink, and is a flow path for discharge of the second ink from the coupling pipes 13*d*, the second ink being introduced from the corresponding head main body 14.

The bypass flow path BP1 and the bypass flow path BP2 are provided for each of the head main bodies 14 and the bypass flow path BP1 and the bypass flow path BP2 are flow paths through which the first common liquid chamber R1 and the second common liquid chamber R2 described above communicate with each other. However, the bypass flow path BP1 and the bypass flow path BP2 are positioned on opposite sides to each other with respect to the center of the first common liquid chamber R1 or the second common liquid chamber R2 in the direction along the X-axis. In an example shown in FIG. 8, the bypass flow path BP1 is positioned closer to a side to which the V2 direction extends than the bypass flow path BP2 is. In addition, each of the bypass flow path BP1 and the bypass flow path BP2 has a U-like shape as seen in a direction along the Z-axis.

Figure 10:
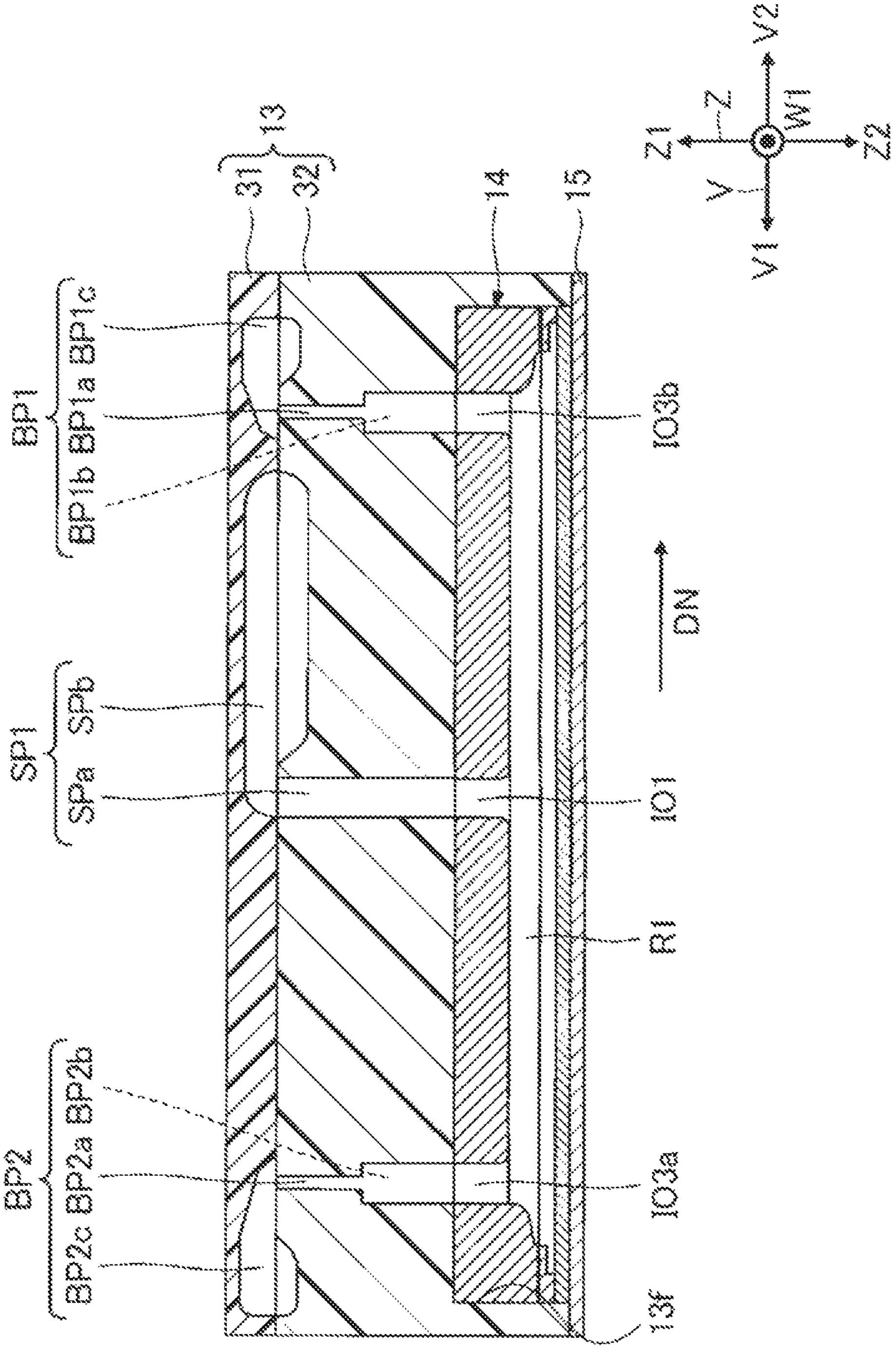
FIG. 10 is a sectional view taken along line X-X in FIG. 8.

FIG. 10 is a sectional view taken along line X-X in FIG. 8. In FIG. 10, the head main body 14 and the fixation plate 15 are shown in addition to the holder 13. As shown in FIG. 10, the holder 13 has a plate-like shape that extends in directions perpendicular to the Z-axis. The holder 13 includes a layer 31 and a layer 32 and the layer 31 and the layer 32 are stacked in this order in the Z2 direction. Each of the layer 31 and the layer 32 is formed of, for example, a resin material and is formed through injection molding. The layer 31 and the layer 32 are bonded to each other by means of, for example, an adhesive.

Each of the above-described flow paths that the holder 13 includes is provided in a laminated body composed of the layer 31 and the layer 32, and a recess portion 13*f* for accommodation of the head main body 14 is provided at a surface of the layer 32 that faces the Z2 direction. In an example shown in FIG. 10, the thickness of the layer 32 is larger than the thickness of the layer 31. Therefore, the thickness of the layer 32 required for formation of the recess portion 13*f* can be easily secured.

Here, the first distribution supply flow path SP1 includes a vertical flow path SPa and a horizontal flow path SPb. The vertical flow path SPa extends in the direction along the Z-axis and is composed of a hole that penetrates the layer 32. The horizontal flow path SPb extends in a direction orthogonal to the Z-axis, and is provided between the layer 31 and the layer 32. In the example shown in FIG. 10, the horizontal flow path SPb is composed of a groove provided at a surface of the layer 31 that faces the Z2 direction and a groove provided at a surface of the layer 32 that faces the Z1 direction. Note that, although not shown in FIG. 10, the second distribution supply flow path SP2 is configured in the same manner as the first distribution supply flow path SP1.

The bypass flow path BP1 includes a first portion BP1*a*, a second portion BP1*b*, and a third portion BP1*c*. Each of the first portion BP1*a* and the second portion BP1*b* extends in the direction along the Z-axis and is composed of a hole that penetrates the layer 32. The third portion BP1*c* extends in a direction orthogonal to the Z-axis, and is provided between the layer 31 and the layer 32. In the example shown in FIG. 10, the third portion BP1*c* is composed of a groove provided at the surface of the layer 31 that faces the Z2 direction and a groove provided at the surface of the layer 32 that faces the Z1 direction.

Similarly, the bypass flow path BP2 includes a first portion BP2*a*, a second portion BP2*b*, and a third portion BP2*c*. Each of the first portion BP2*a* and the second portion BP2*b* extends in the direction along the Z-axis and is composed of a hole that penetrates the layer 32. The third portion BP2*c* extends in a direction orthogonal to the Z-axis, and is provided between the layer 31 and the layer 32. In the example shown in FIG. 10, the third portion BP2*c* is composed of a groove provided at the surface of the layer 31 that faces the Z2 direction and a groove provided at the surface of the layer 32 that faces the Z1 direction.

The two bypass flow paths BP are formed to be wider than each of the M individual flow paths PJ. Therefore, the two bypass flow paths BP have lower flow path resistances than each of the M individual flow paths PJ. In addition, the two bypass flow paths BP are formed to be narrower than each of the first common liquid chamber R1 and the second common liquid chamber R2. In addition, as described above, the two bypass flow paths BP are formed to be bent. Therefore, the flow path resistance of the two bypass flow paths BP is greater than those of the first common liquid chamber R1 and the second common liquid chamber R2.

1-6. Configuration of Head Main Body 14

Figure 11:
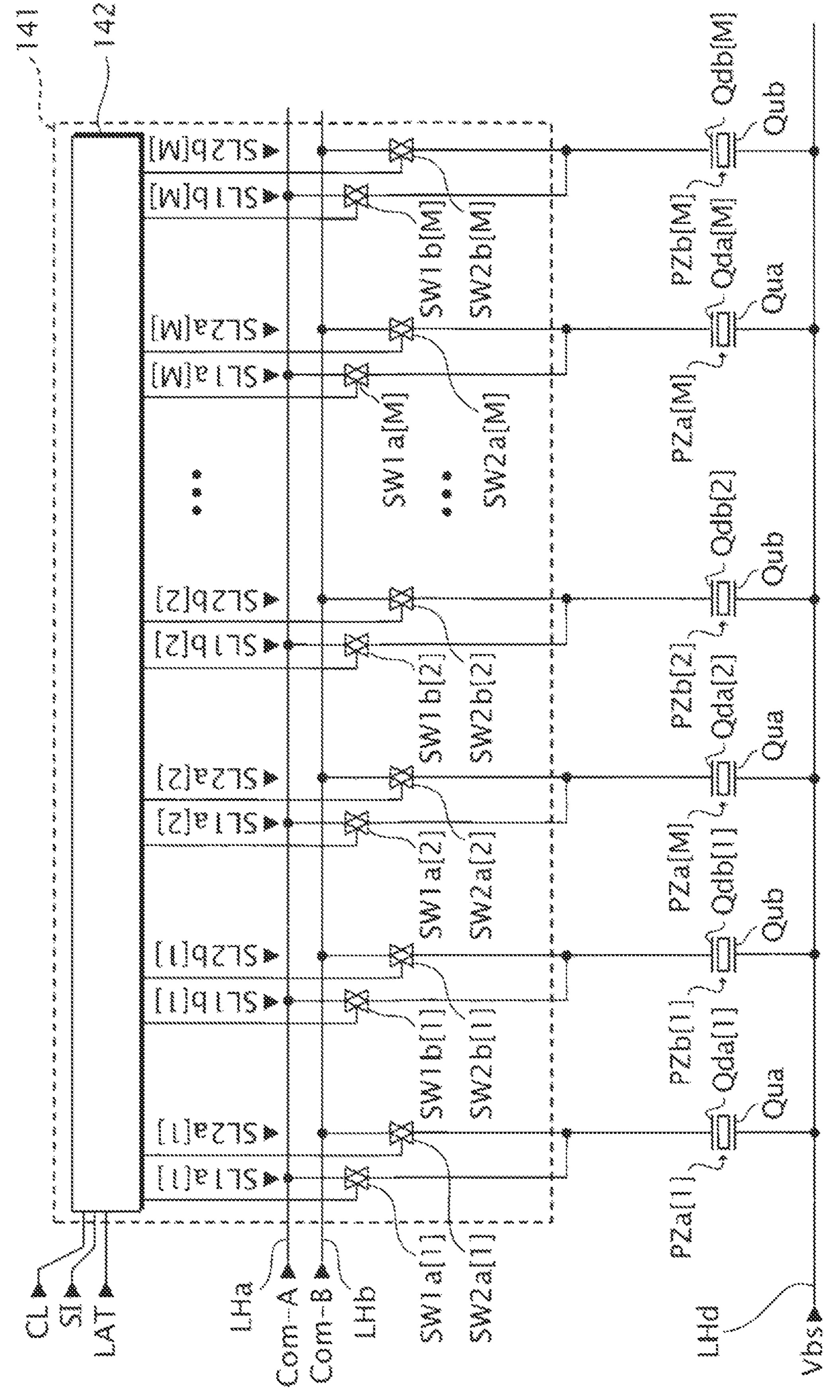
FIG. 11 is a block diagram showing an example of the configuration of the head main body.

FIG. 11 is a block diagram showing an example of the configuration of the head main body 14. The liquid ejection head 10 include, in addition to the switching circuit 141 described above, an internal wire LHa to which the drive signal Com-A from the drive signal generation circuit 190 is supplied, an internal wire LHb to which the drive signal Com-B from the drive signal generation circuit 190 is supplied, and an internal wire LHd to which the reference potential Vbs is supplied.

As shown in FIG. 11, the switching circuit 141 includes M switches SW1*a*[1] to SW1*a*[M], M switches SW2*a*[1] to SW2*a*[M], M switches SW1*b*[1] to SW1*b*[M], M switches SW2*b*[1] to SW2*b*[M], and a coupling state designation circuit 142 that designates the state of coupling of each switch. Note that, as each switch, for example, a transmission gate can be adopted.

The coupling state designation circuit 142 generates, based on the designation signal SI supplied from the control module 120 and at least a portion of a latch signal LAT, coupling state designation signals SL1*a*[1] to SL1*a*[M], coupling state designation signals SL2*a*[1] to SL2*a*[M], coupling state designation signals SL1*b*[1] to SL1*b*[M], and coupling state designation signals SL2*b*[1] to SL2*b*[M].

A coupling state designation signal SL1*a*[m] is for designation of whether a switch SW1*a*[m] is to be turned on or off, with respect to any m ranging from 1 to M. A coupling state designation signal SL2*a*[m] is for designation of whether a switch SW2*a*[m] is to be turned on or off, with respect to any m ranging from 1 to M. A coupling state designation signal SL1*b*[m] is for designation of whether a switch SW1*b*[m] is to be turned on or off, with respect to any m ranging from 1 to M. A coupling state designation signal SL2*b*[m] is for designation of whether a switch SW2*b*[m] is to be turned on or off, with respect to any m ranging from 1 to M.

The switch SW1*a*[m] switches, in accordance with the coupling state designation signal SL1*a*[m], between conduction and non-conduction between the internal wire LHa and individual electrodes Qda [m] of a piezoelectric element PZa[m] provided in an ejector D[m], with respect to any m ranging from 1 to M. For example, the switch SW1*a*[m] is turned on when the coupling state designation signal SL1*a* [m] is at a high level and is turned off when the coupling state designation signal SL1*a*[m] is at a low level.

The switch SW2*a*[m] switches, in accordance with the coupling state designation signal SL2*a*[m], between conduction and non-conduction between the internal wire LHb and the individual electrodes Qda [m] of the piezoelectric element PZa[m] provided in the ejector D[m], with respect to any m ranging from 1 to M. For example, the switch SW2*a*[m] is turned on when the coupling state designation signal SL2*a*[m] is at a high level and is turned off when the coupling state designation signal SL2*a*[m] is at a low level.

The switch SW1*b*[m] switches, in accordance with the coupling state designation signal SL1*b*[m], between conduction and non-conduction between the internal wire LHa and individual electrodes Qdb [m] of a piezoelectric element PZb[m] provided in the ejector D[m], with respect to any m ranging from 1 to M. For example, the switch SW1*b*[m] is turned on when the coupling state designation signal SL1*b* [m] is at a high level and is turned off when the coupling state designation signal SL1*b*[m] is at a low level.

The switch SW2*b*[m] switches, in accordance with the coupling state designation signal SL2*b*[m], between conduction and non-conduction between the internal wire LHb and the individual electrodes Qdb [m] of the piezoelectric element PZb[m] provided in the ejector D[m], with respect to any m ranging from 1 to M. For example, the switch SW2*b*[m] is turned on when the coupling state designation signal SL2*b*[m] is at a high level and is turned off when the coupling state designation signal SL2*b*[m] is at a low level.

In the first embodiment, it will be assumed that the waveforms of the drive signals Com supplied to two piezoelectric elements PZ included in one ejector D are approximately the same as each other. Here, "being approximately the same as each other" is a concept including a case where the waveforms can be considered as waveforms that are the same as each other when an error is taken into consideration, in addition to a case where the waveforms are completely the same as each other. For example, when both of the switch SW1*a*[m] and the switch SW1*b*[m] are on and both of the switch SW2*a*[m] and the switch SW2*b*[m] are off, the drive signal Com-A is supplied to two piezoelectric elements PZ included in the ejector D[m], with respect to any m ranging from 1 to M.

1-7. Operation in Comparative Embodiment

As described above, ink in the first embodiment has a feature of being easily thickened. Therefore, ink thickened to a certain degree may stay inside the nozzles N or near the nozzles N before the printing ejection operation. Hereinafter, thickened ink will be referred to as "thickened ink". Before the printing ejection operation, the nozzle surfaces FN are sealed by the cap 182 through the cap sealing operation, and basically, ink in the nozzles N and air are isolated from each other. Therefore, ideally, thickening of the ink due to evaporation of a liquid component in the ink does not occur during the cap sealing operation. However, in practice, it is difficult to completely prevent contact between the ink in the nozzles N and the air even during the cap sealing operation. Therefore, in the case of the ink in the first embodiment, in a specific situation where the cap sealing operation is performed for a long time or an environmental temperature is high, thickened ink may stay inside the nozzles N or near the nozzles N even during the cap sealing operation.

It may be conceivable that it is possible to eliminate a problem that the thickened ink stays by performing the circulation operation and the minute vibration operation. However, although depending on the order in which the circulation operation and the minute vibration operation are started, the thickened ink may stay. Hereinafter, an embodiment in which the circulation operation is started first and then the minute vibration operation is started will be described as a "comparative embodiment". The comparative embodiment will be described with reference to FIGS. 12 to 14.

Figure 12:
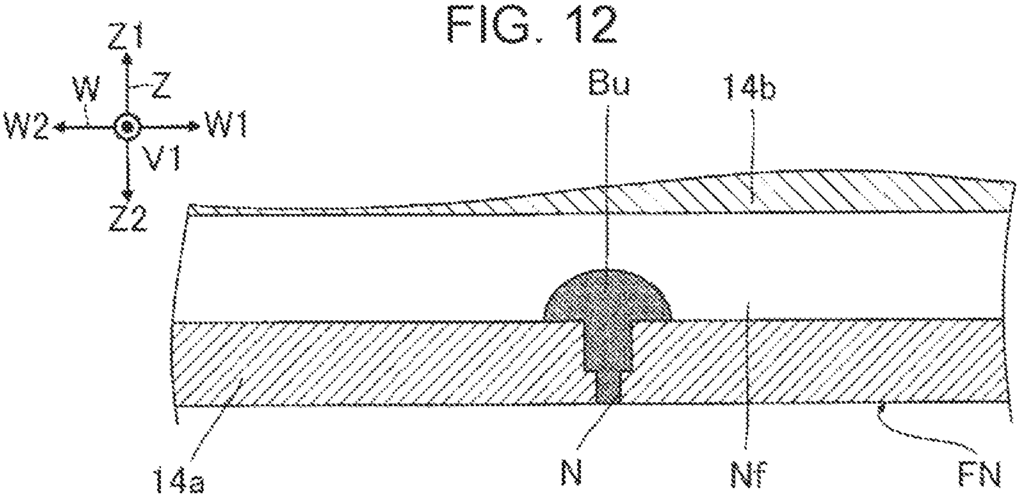
FIG. 12 is a view showing how the vicinity of a nozzle is before a circulation operation is started in a comparative embodiment.
Figure 13:
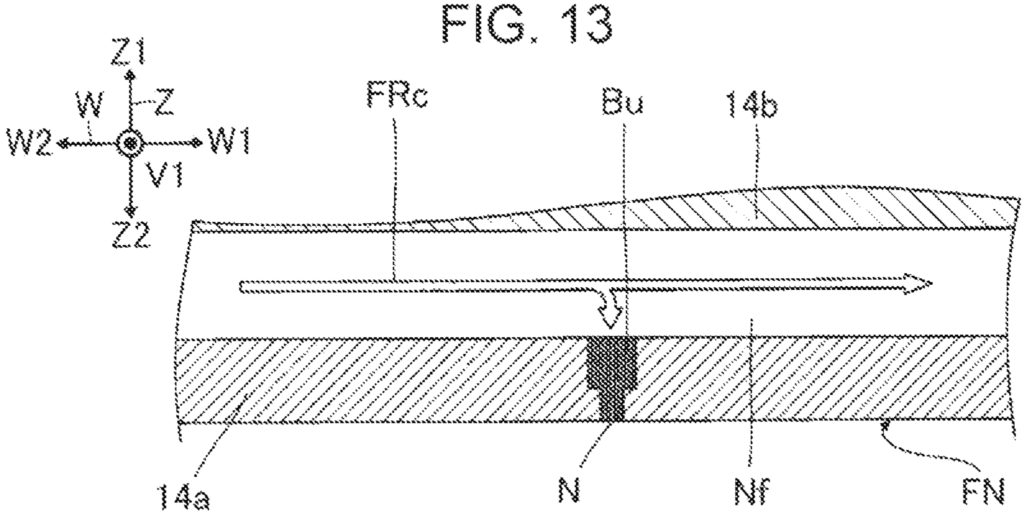
FIG. 13 is a view showing how the vicinity of the nozzle is after the circulation operation is started in the comparative embodiment.

FIG. 12 is a view showing how the vicinity of the nozzle N is before the circulation operation is started in the comparative embodiment. FIG. 13 is a view showing how the vicinity of the nozzle N is after the circulation operation is started in the comparative embodiment. FIGS. 12 to 14 and FIGS. 16 to 18 (which will be used for description later) show enlarged views of the vicinity of the nozzle N in the cross-sectional view of the head main body 14 shown in FIG. 6. As shown in FIG. 12, thickened ink Bu stays inside and near the nozzle N. As shown in FIG. 13, when the circulation operation is started, the stream FRc along the nozzle flow path Nf is generated. Ink staying in the nozzle flow path Nf, which is a portion of the thickened ink Bu staying inside and near the nozzle N, is discharged to the second common liquid chamber R2 because of the stream FRc. The thickened ink Bu inside the nozzle N continues to stay throughout the period Tab. Furthermore, a portion of the stream FRc flows into the nozzle N. Because of this inflow, a portion of the thickened ink that is in the vicinity of the nozzle N may flow into the inside of the nozzle N and thus stay inside the nozzle N. A portion of the thickened ink staying inside the nozzle N may result in further ink thickening inside the nozzle N.

Figure 14:
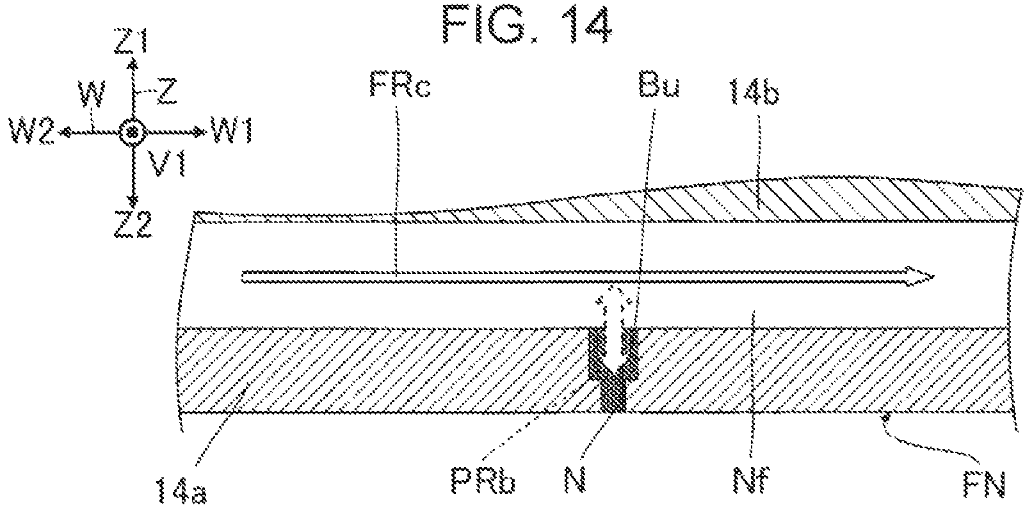
FIG. 14 is a view showing how the vicinity of the nozzle N is after the minute vibration operation is performed for a certain period in the comparative embodiment.

FIG. 14 is a view showing how the vicinity of the nozzle N is after the minute vibration operation is performed for a certain period in the comparative embodiment. When the minute vibration operation is started, a pressure change PRb along the Z-axis is generated in the nozzle N. However, the pressure change PRb caused by the minute vibration operation may be insufficient to cause the thickened ink Bu to flow as a result of the further thickening inside the nozzle N. Since the thickened ink does not flow, the thickening cannot be eliminated and ink cannot be ejected at the time of the printing ejection operation.

Therefore, in the case of the liquid ejecting apparatus 100 according to the first embodiment, the minute vibration operation is started first and then the circulation operation is started. A series of operations in the liquid ejecting apparatus 100 according to the first embodiment will be described with reference to FIGS. 15 to 18.

1-8. Operation in Liquid Ejecting Apparatus 100

Figure 15:
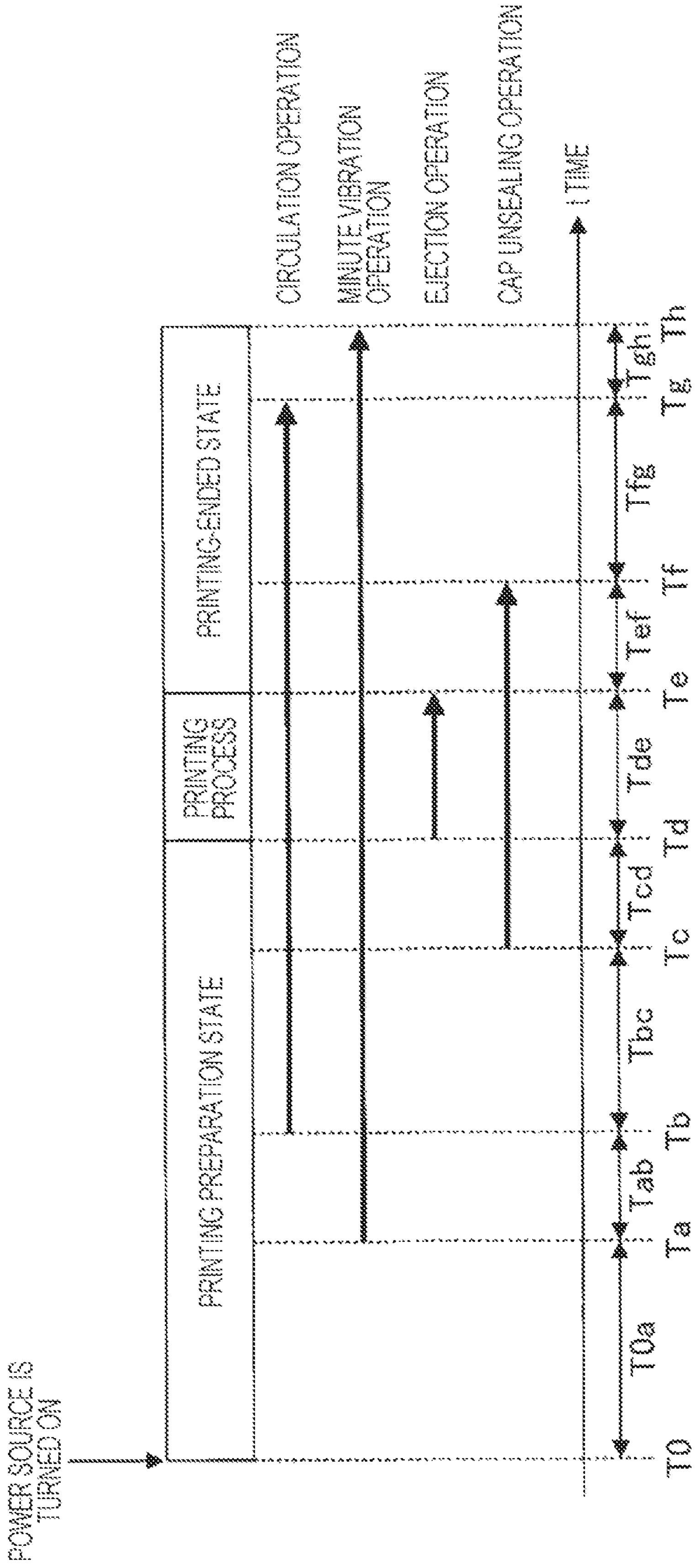
FIG. 15 is a diagram showing a series of operations in the liquid ejecting apparatus.

FIG. 15 is a diagram showing a series of operations in the liquid ejecting apparatus 100. While the series of operations shown in FIG. 15 is being performed, the liquid ejecting apparatus 100 may enter a printing preparation state which is a state where preparation for a printing process is performed, a state where the printing process is performed, and a printing-ended state where the printing process is finished. As shown in FIG. 15, throughout a period from a time T0 to a time Td, the state of the liquid ejecting apparatus 100 is the printing preparation state. Throughout a period from the time Td to a time Te, the liquid ejecting apparatus 100 performs the printing process. Throughout a period from the time Te to a time Th, the state of the liquid ejecting apparatus 100 is the printing-ended state.

As shown in FIG. 15, when a power source is turned on at the time T0 in response to an operation performed by a user of the liquid ejecting apparatus 100 and the printing data Img is supplied from the host computer, the minute vibration control section 123 starts the minute vibration operation at a time Ta. Hereinafter, the user of the liquid ejecting apparatus 100 will be simply referred to as a "user". A period T0*a* from the time T0 to the time Ta is, for example, 5 seconds. Since the state of the vicinity of a nozzle at the time T0*a* is the same as a state shown in FIG. 12, illustration and description thereof will be omitted. As shown in FIG. 15, the minute vibration control section 123 continues, until the time Th is reached, the minute vibration operation which is started at the time Ta. The time Ta is an example of a "second time". The time Th is an example of a "fifth time".

As shown in FIG. 15, the circulation control section 127 starts the circulation operation at a time Tb later than the time Ta. The period Tab from the time Ta to the time Tb is shorter than the period T0*a* and is, for example, 0.5 seconds. The time Tb is an example of a "first time". The period Tab is an example of "a time interval between the first time and the second time".

Figure 16:
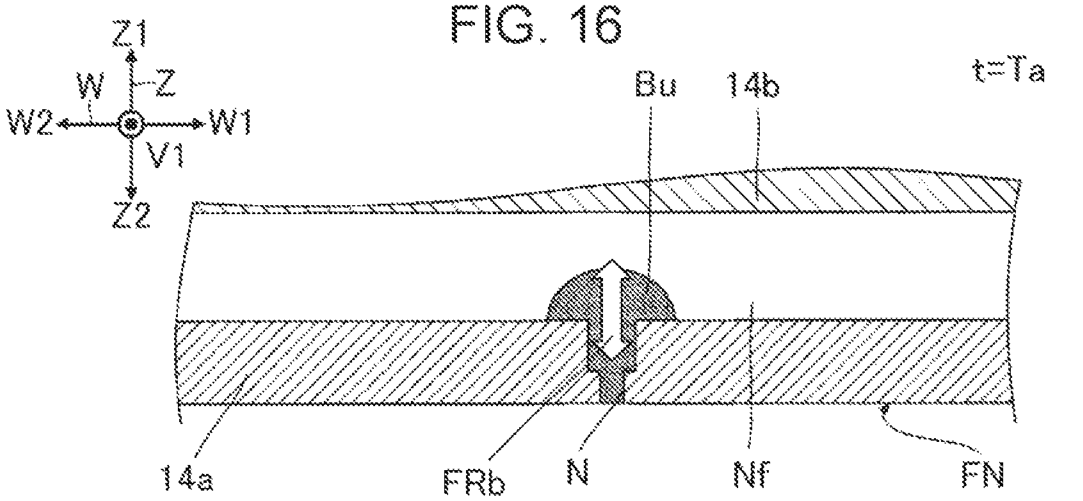
FIG. 16 is a view showing how the vicinity of the nozzle is at a certain time.
Figure 17:
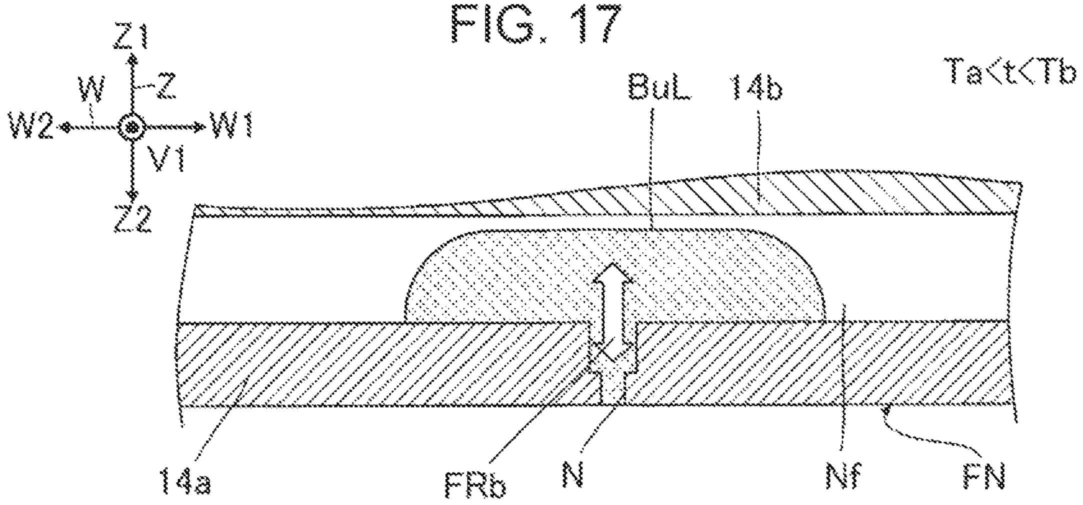
FIG. 17 is a view showing how the vicinity of the nozzle is in a certain period.

FIG. 16 is a view showing how the vicinity of the nozzle N is at the time Ta. As shown in FIG. 16, when the minute vibration operation is started, the stream FRb along the Z-axis is generated in the nozzle N. FIG. 17 is a view showing how the vicinity of the nozzle N is in a period Tab. Because of the stream FRb, the thickened ink Bu is diffused into the individual flow path PJ, and the viscosity of the ink inside and near the nozzle N is lowered in comparison with a time before the start of the minute vibration operation. In FIG. 17, the thickened ink of which the viscosity has been lowered is shown as thickened ink BuL.

As shown in FIG. 15, the circulation control section 127 continues, until a time Tg is reached, the circulation operation started at the time Tb and ends the circulation operation at the time Tg. The time Tg is earlier than the time Th. The time Tg is an example of a "fourth time".

As shown in FIG. 15, the time Tb is earlier than the time Th. Therefore, the minute vibration control section 123 is continuing the minute vibration operation at the time Tb.

As shown in FIG. 15, the cap control section 125 starts the cap unsealing operation at a time Tc later than the time Tb. A period Tbc from the time Tb to the time Tc is shorter than the period T0*a* and longer than the period Tab. The period Tbc is, for example, 3 seconds. The cap control section 125 continues, until a time Tf is reached, the cap unsealing operation started at the time Tc and ends the cap unsealing operation at the time Tf. The time Tf is earlier than the time Tg. The time Tc is an example of a "third time". The time Tf is an example of a "sixth time". The period Tbc is an example of "a time interval between the second time and the third time".

As shown in FIG. 15, the time Tc is earlier than the time Tg and the time Th. Therefore, at the time Tc, the circulation control section 127 is continuing the circulation operation, and the minute vibration control section 123 is continuing the minute vibration operation.

Figure 18:
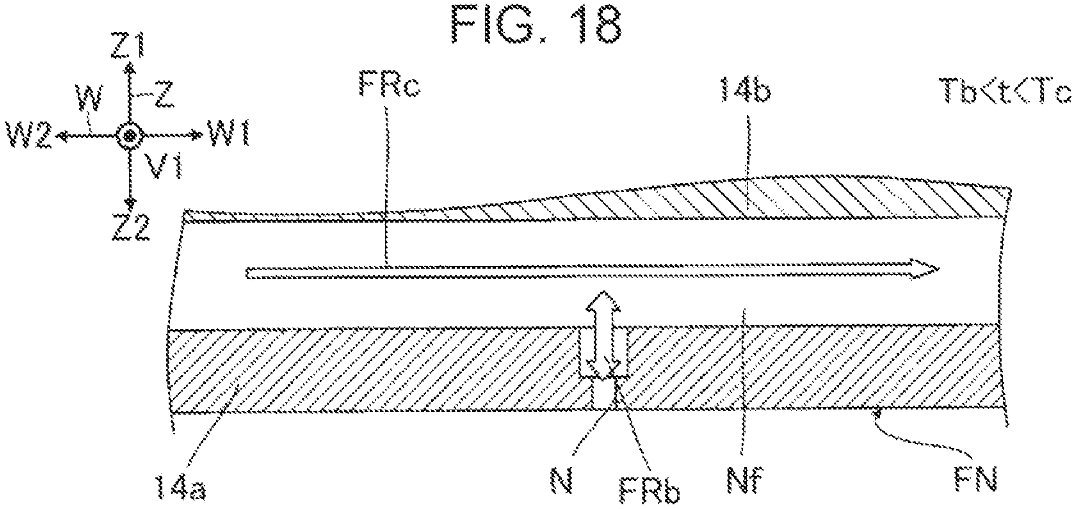
FIG. 18 is a view showing how the vicinity of the nozzle is in a certain period.

FIG. 18 is a view showing how the vicinity of the nozzle N is in the period Tbc. As shown in FIG. 18, when the circulation operation is started, the stream FRc along the nozzle flow path Nf is generated. The thickened ink BuL is discharged to the second common liquid chamber R2 by the stream FRc. As shown in FIG. 13, a portion of the stream FRc flows into the nozzle N. However, the viscosity of the ink inside the nozzle N in the period Tbc is lower than the viscosity of the ink in the nozzle N in the comparative embodiment since the viscosity is lowered in the period Tab. Therefore, a probability that the ink inside the nozzle is thickened to such a degree that the ink inside the nozzle cannot be caused to flow by the minute vibration operation in the period Tbc is low in comparison with the comparative embodiment. Therefore, according to the first embodiment, a probability of a phenomenon in which ink cannot be ejected as in the comparative embodiment can be reduced and thus the ejection property, which is one or both of the ejection amount and the ejection rate, can be maintained. Since the ejection property can be maintained, ejection failure can be suppressed. Examples of the ejection failure include a so-called dot omission in which ink is not ejected from the nozzle N, a flying curve phenomenon, and the like.

Both the circulation operation and the minute vibration operation are operations of applying pressure to ink. However, as can be understood from FIG. 18, the minute vibration operation generates the stream FRb along a direction in which the nozzle N extends (that is, the stream FRb along the Z-axis) while the circulation operation generates the stream FRc along the nozzle flow path Nf. The reason why the behavior differs between the circulation operation and the minute vibration operation will be described below.

The circulation operation only generates an ink stream in the liquid ejection head 10 that flows from an upstream area and a downstream area in the liquid ejection head 10 and cannot generate a local stream flowing from the individual flow path PJ to the nozzle N. Meanwhile, regarding the minute vibration operation, the individual flow path PJ is in a state of being like a closed space since the narrowed portions Ap are present at both ends of the individual flow path PJ. Therefore, the ratio of a pressure transmitted to the nozzle N to a pressure applied to ink because of the minute vibration operation is larger than the ratio of a pressure transmitted to the narrowed portions Ap to the pressure applied to the ink because of the minute vibration operation. Accordingly, a large pressure is transmitted to the nozzle N in comparison with an embodiment in which no narrowed portion Ap is present. Therefore, it is conceivable that the minute vibration operation according to the first embodiment generates the stream FRb along the Z-axis that is large in comparison with the embodiment in which no narrowed portion Ap is present. In addition, in the first embodiment, the substantially same drive signals Com are supplied to the piezoelectric element PZa positioned upstream of the nozzle N and the piezoelectric element PZb positioned downstream of the nozzle N in one ejector D when the minute vibration operation is performed. Therefore, a pressure applied to ink from the piezoelectric element PZa and a pressure applied to the ink from the piezoelectric element PZb are merged with each other in the vicinity of the nozzle N which is positioned at the approximately center of the individual flow path PJ. It is conceivable that a portion of the merged pressure proceeds toward the nozzle N. Therefore, it is also conceivable that the minute vibration operation generates the stream FRb along the Z-axis.

In addition, in the case of the circulation operation, the stream FRc along the nozzle flow path Nf is generated by a pressure difference between the upstream area and the downstream area in the liquid ejection head 10. However, since a pressure at a meniscus position and the atmospheric pressure are balanced, almost no stream along the Z-axis is generated. The meniscus is a surface of ink that is formed in the nozzle N. The pressure at the meniscus position is a pressure applied to the meniscus by the ink positioned inside the meniscus. Meanwhile, in the case of the minute vibration operation, there is a difference between the pressure at the meniscus position and the atmospheric pressure. Therefore, the stream FRb along the Z-axis can be generated.

In addition, since the circulation operation generates a unidirectional stream flowing from the upstream area to the downstream area in the liquid ejection head 10, the circulation operation has an effect of replacing the ink in the individual flow path PJ. Meanwhile, since the minute vibration operation generates a bidirectional stream that alternately repeats flowing in the Z1 direction and flowing in the Z2 direction, the minute vibration operation has an effect of stirring ink inside and near the nozzle N and an effect of diffusing ink thickening.

As shown in FIG. 15, the ejection control section 122 starts the printing ejection operation at the time Td later than the time Tc. The ejection control section 122 continues the printing ejection operation until the time Te later than the time Td is reached, and ends the printing ejection operation at the time Te. The liquid ejecting apparatus 100 in a period Tde from the time Td to the time Te will be described with reference to FIGS. 19 and 20.

Figure 19:
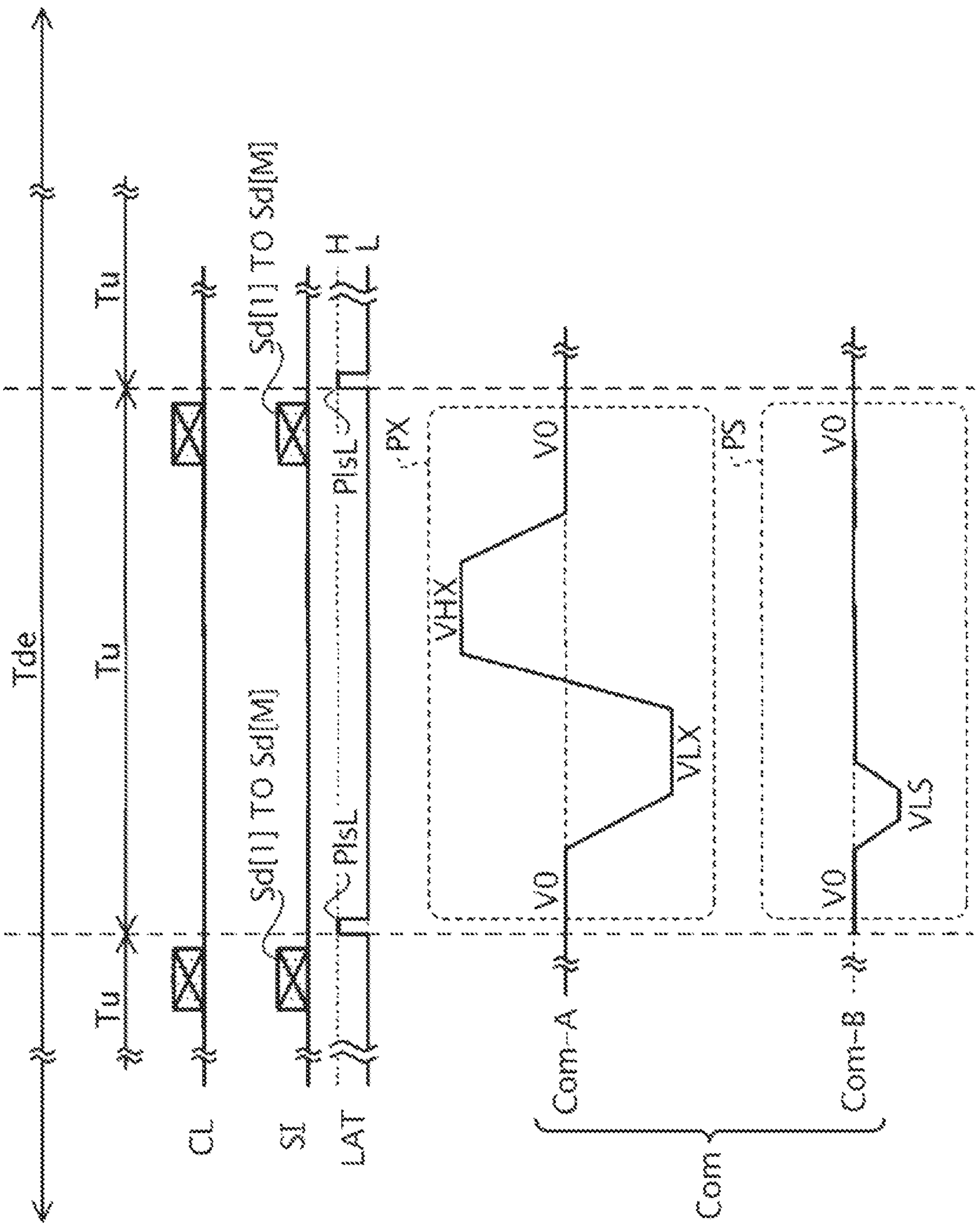
FIG. 19 is a timing chart for description of the operation of the liquid ejecting apparatus in a certain period.

FIG. 19 is a timing chart for description of the operation of the liquid ejecting apparatus 100 in the period Tde. The period Tde includes one or more unit periods Tu. As shown in FIG. 19, the control module 120 outputs the latch signal LAT having pulses P1*s*L. Accordingly, the control module 120 defines the unit period Tu as a period from a rise of the pulse P1*s*L to the next rise of the pulse P1*s*L.

The designation signal SI includes, with respect to one head main body 14, individual designation signals Sd[1] to Sd[M] that designate the way in which the ejectors D[1] to D[M] are driven in each of the unit periods Tu. In addition, as shown in FIG. 19, the control module 120 supplies, to the coupling state designation circuit 142, the designation signal SI including the individual designation signals Sd[1] to Sd[M] in synchronization with a clock signal CL for one unit period Tu or each of a plurality of the unit periods Tu before the unit period Tu is started. In this case, the coupling state designation circuit 142 generates the coupling state designation signals SL1*a*[m], SL2*a*[m], SL1*b*[m], and SL2*b*[m] based on an individual designation signal Sd[m] in the unit period Tu, with respect to any m ranging from 1 to M.

Note that, the individual designation signal Sd[m] according to the first embodiment is a signal for designation of any one of the printing ejection operation and the minute vibration operation with respect to the ejector D[m] in each unit period Tu, with respect to any m ranging from 1 to M. In the first embodiment, for example, it will be assumed that the individual designation signal Sd[m] is a 1-bit digital signal as shown in FIG. 20, with respect to any m ranging from 1 to M.

As shown in FIG. 19, the drive signal generation circuit 190 outputs the drive signal Com-A having an ejection waveform PX that causes ink to be ejected from the nozzle N and the drive signal Com-B having a minute vibration waveform PS that causes ink in the nozzle N to vibrate to such a degree that no ink is ejected from the nozzle N. As can be understood from FIG. 19, the ejection waveform PX and the minute vibration waveform PS are different from each other. The minute vibration waveform PS is an example of a "first waveform". The ejection waveform PX is an example of a "second waveform".

Potentials at the start and end of the ejection waveform PX and potentials at the start and end of the minute vibration waveform PS are set to a reference potential V0. A manufacturer of the liquid ejecting apparatus 100 determines the ejection waveform PX and the minute vibration waveform PS such that a potential difference between a maximum potential VHX and a minimum potential VLX of the ejection waveform PX is greater than a potential difference between a minimum potential VLS of the minute vibration waveform PS and the reference potential V0. Furthermore, the manufacturer of the liquid ejecting apparatus 100 determines the minute vibration waveform PS such that an ink stream in the Z1 direction that is generated in the nozzle N reaches the individual flow path PJ (more specifically, the nozzle flow path Nf) when the drive signal Com-B having the minute vibration waveform PS is supplied to the piezoelectric elements PZ. Note that, the ink stream in the Z1 direction is an example of "a liquid stream toward an individual flow path".

When the individual designation signal Sd[m] is for designation of the printing ejection operation with respect to the ejector D[m], the coupling state designation circuit 142 sets the coupling state designation signals SL1*a*[m] and SL1*b*[m] to a high level in the unit period Tu and sets the coupling state designation signals SL2*a*[m] and SL2*b*[m] to a low level in the unit period Tu, with respect to any m ranging from 1 to M. Accordingly, the ejector D[m] ejects ink in the unit period Tu so that a dot is formed on the medium PP.

In addition, when the individual designation signal Sd[m] is for designation of the minute vibration operation with respect to the ejector D[m], the coupling state designation circuit 142 sets the coupling state designation signals SL1*a*[m] and SL1*b*[m] to a low level in the unit period Tu and sets the coupling state designation signals SL2*a*[m] and SL2*b*[m] to a high level in the unit period Tu, with respect to any m ranging from 1 to M. Accordingly, in the ejector D[m], ink in the nozzle N is vibrated in the unit period Tu and no dot is formed on the medium PP.

The drive control section 121 generates, based on the printing data Img, an individual designation signal Sd for designation of any one of the printing ejection operation and the minute vibration operation with respect to each of the M ejectors D of each of the six head main bodies 14. Therefore, in the period Tde, the minute vibration operation is temporarily stopped in the ejector D for which the printing ejection operation is designated, and the printing ejection operation is temporarily stopped in the ejector D for which the minute vibration operation is designated. For example, in one unit period Tu within the period Tde, the minute vibration operation is temporarily stopped in an ejector D[m3] for which the printing ejection operation is designated and the minute vibration operation is continued in an ejector D[m4] for which the minute vibration operation is designated. Furthermore, when the minute vibration operation is designated for the ejector D[m3] in the next unit period Tu after the above-described unit period Tu, the minute vibration operation is restarted and the printing ejection operation is temporarily stopped in the ejector D[m3]. Here, m3 and m4 are integers in a range from 1 to M and are integers different from each other.

Although description about the period Tde has been made with reference to FIG. 19, even when the minute vibration operation is performed in the period Tab, the period Tbc, and a period Tcd, the drive control section 121 generates the individual designation signal Sd[m] for designation of the minute vibration operation, with respect to every m ranging from 1 to M. Accordingly, the minute vibration operation is performed in the period Tab, the period Tbc, and the period Tcd as well. Note that, since the printing ejection operation is not performed in the period Tab, the period Tbc, and the period Tcd, the drive control section 121 may generate the waveform designation signal dCom such that the drive signal Com-A set to have the reference potential Vbs and the drive signal Com-B having the minute vibration waveform PS are supplied to the head main bodies 14.

FIG. 20 is a description diagram for description of generation of the coupling state designation signals SL1*a*[m], SL2*a*[m], SL1*b*[m], and SL2*b*[m], with respect to any m ranging from 1 to M. The coupling state designation circuit 142 decodes the individual designation signal Sd[m] according to FIG. 20 and generates the coupling state designation signals SL1*a*[m], SL2*a*[m], SL1*b*[m], and SL2*b*[m].

As shown in FIG. 20, the individual designation signal Sd[m] according to the first embodiment shows any of a value (1) for designation of the printing ejection operation and a value (0) for designation of the minute vibration operation. In addition, when the individual designation signal Sd[m] shows (1), the coupling state designation circuit 142 sets the coupling state designation signals SL1*a*[m] and SL1*b*[m] to a high level in the unit period Tu and when the individual designation signal Sd[m] shows (0), the coupling state designation circuit 142 sets the coupling state designation signals SL2*a*[m] and SL2*b*[m] to a high level in the unit period Tu. Otherwise, the coupling state designation circuit 142 sets each signal to a low level.

The description will be made referring again to FIG. 15. When the printing ejection operation ends at the time Te, the cap control section 125 ends the cap unsealing operation and starts the cap sealing operation at the time Tf later than the time Te. The circulation control section 127 ends the circulation operation at the time Tg later than the time Tf.

The minute vibration control section 123 ends the minute vibration operation at the time Th later than the time Tg. A period Tgh from the time Tg to the time Th is shorter than the period Tab. Note that, the period Tgh is an example of "a time interval between the fourth time and the fifth time". Even in a period Tef from the time Te to the time Tf, a period Tfg from the time Tf to the time Tg, and the period Tgh, the drive control section 121 generates the individual designation signal Sd[m] for designation of the minute vibration operation, with respect to every m ranging from 1 to M. Accordingly, the minute vibration operation is performed in the period Tef, the period Tfg, and the period Tgh as well.

1-9. Summary of First Embodiment

Hereinafter, the liquid ejecting apparatus 100 according to the first embodiment will be described while using any integer m1 ranging from 1 to m and m2 which is an integer different from the integer m1 in a range from 1 to M.

The liquid ejecting apparatus 100 according to the first embodiment includes the liquid ejection head 10 and the control module 120. The control module 120 functions as the circulation control section 127 and the minute vibration control section 123. The liquid ejection head 10 includes the piezoelectric element PZa[m1] that is driven in response to supply of the drive signal Com, the nozzle N[m1] that ejects ink by means of a pressure that is applied when the piezoelectric element PZa[m1] is driven, and the individual flow path PJ[m1] that communicates with the nozzle N[m1], through which ink is supplied to the nozzle N[m1], and through which ink not ejected from the nozzle N[m1] is discharged. The circulation control section 127 controls the circulation operation of circulating the ink in the individual flow path PJ[m1]. The minute vibration control section 123 supplies the drive signal Com-B having the minute vibration waveform PS to the piezoelectric element PZa[m1] so as to control the minute vibration operation of causing ink in the nozzle N[m1] to vibrate to such a degree that the ink is not ejected from the nozzle N[m1]. The circulation control section 127 starts the circulation operation at the time Tb. The minute vibration control section 123 starts the minute vibration operation at the time Ta later than the time Tb.

As described with reference to FIGS. 12 to 14, in the comparative embodiment, thickening may be progressed inside the nozzle N such that ink being cannot be ejected. Meanwhile, according to the first embodiment, thickened ink in the nozzle N[m1] is diffused by the stream FRb caused by the minute vibration operation in the period Tab and thus the viscosity of the thickened ink is lowered. Therefore, a probability of a phenomenon in which ink cannot be ejected and a decrease in ejection property can be reduced.

In addition, when the thickening of the ink inside or near the nozzle N is not progressed so much, an effect of stirring ink inside and near the nozzle N and an effect of diffusing ink thickening of the minute vibration operation can be exhibited. In a case where a certain period is required for the effects of the minute vibration operation to be exhibited, thickening can be eliminated more quickly than in the comparative embodiment so that a transition into a state where printing can be performed can be made when the minute vibration operation is started before the circulation operation. Since the thickening can be eliminated more quickly than in the comparative embodiment, it is possible to shorten a period for which the user waits for the end of the printing process.

In addition, the liquid ejecting apparatus 100 includes the cap 182 that seals the nozzle surface FN provided with the nozzle N[m1]. The control module 120 also functions as the cap control section 125. The cap control section 125 controls an unsealing operation of unsealing the nozzle surface FN sealed by the cap 182. The cap control section 125 starts the cap unsealing operation at the time Tc later than the time Tb.

When the nozzle surface FN is unsealed, evaporation of a solvent in ink at the nozzle N[m1] becomes remarkable and thus thickening may be rapidly progressed inside and near the nozzle N[m1]. Therefore, in the first embodiment, the circulation operation and the minute vibration operation are started before the time Tc at which thickening of ink is rapidly progressed. Therefore, thickening of ink inside and near the nozzle N[m1] can be suppressed in comparison with an embodiment in which the circulation operation and the minute vibration operation are started after the time Tc.

In addition, the period Tab is shorter than that of the period Tbc. In other words, a period in which only the minute vibration operation is performed before the printing ejection operation is shorter than a period in which only the circulation operation and the minute vibration operation are performed before the printing ejection operation.

It is preferable that the cap sealing operation is in progress in the period Tbc and the circulation operation and the minute vibration operation are performed for a certain period so that thickening is eliminated as much as possible before the start of the cap unsealing operation. Meanwhile, the period Tab does not need to be longer than necessary because only to be performed in the period Tab is lowering the viscosity of ink in the nozzle N by means of the minute vibration operation. If the period Tab is set to be longer than necessary, a period from a time at which the power source is turned on to the time Te (that is, a period for which a user waits for the end of the printing process) is made long, which is not preferable. Therefore, according to the first embodiment, thickening can be eliminated as much as possible before the start of the cap unsealing operation and a time for which the user waits for the end of the printing process can be shortened in comparison with an embodiment in which the period Tab is longer than the period Tbc.

In addition, the control module 120 also functions as the ejection control section 122. The ejection control section 122 supplies the drive signal Com-A having the ejection waveform PX to the piezoelectric element PZa[m1] so as to control the printing ejection operation of causing ink to be ejected from the nozzle N[m1]. The ejection control section 122 starts the printing ejection operation after the time Tc.

At the time Tc, the circulation operation and the minute vibration operation have been already started and thickening of ink inside and near the nozzle N[m1] has been suppressed. When the printing ejection operation is started after the time Tc, the occurrence of ejection failure can be suppressed.

In addition, the circulation control section 127 ends the circulation operation at the time Tg later than the end of the printing ejection operation and the minute vibration control section 123 ends the minute vibration operation at the time Th later than the end of the printing ejection operation.

In other words, the circulation operation and the minute vibration operation are continued until the printing ejection operation is ended. Therefore, it is possible to suppress the progress of thickening during the printing ejection operation.

In addition, the time Th is later than the time Tg. In other words, the liquid ejecting apparatus 100 ends the minute vibration operation after the circulation operation is ended.

Since the circulation operation is ended before the end of the minute vibration operation, it is possible to achieve a state where there is no progress of thickening by replacing ink in the nozzle N by means of the minute vibration operation in a state where there is no stream in the individual flow path PJ in the period Tgh.

In addition, the period Tgh is shorter than that of the period Tab. In other words, a period in which only the minute vibration operation is performed after the printing ejection operation is shorter than a period in which only the minute vibration operation is performed before the printing ejection operation.

Before the printing ejection operation, it is preferable to eliminate thickening as much as possible. However, after the printing ejection operation, it is sufficient that it is possible to replace ink in the nozzle N by means of the stream FRb caused by the minute vibration operation performed to a certain degree. This is because even if the minute vibration operation is performed for a long time after the printing ejection operation, the occurrence of slight evaporation of ink during a period between the end of the circulation operation and the next printing ejection operation cannot be suppressed. Therefore, the minute vibration operation performed for an excessively long time after the printing ejection operation only consumes power. Accordingly, according to the first embodiment, thickening can be eliminated as much as possible before the printing ejection operation and power consumption of the liquid ejecting apparatus 100 can be reduced in comparison with an embodiment in which the period Tgh is longer than the period Tab.

Further, the circulation control section 127 ends the circulation operation at the time Tg, the minute vibration control section 123 ends the minute vibration operation at the time Th, and the cap control section 125 ends the cap unsealing operation at the time Tf earlier than the time Th and the time Tg. In other words, at a time when the cap unsealing operation in which thickening of ink inside and near the nozzle N is rapidly progressed is ended, the circulation operation and the minute vibration operation are in progress.

According to the first embodiment, rapid progress of thickening of ink inside and near the nozzle N can be suppressed in comparison with an embodiment in which the circulation operation and the minute vibration operation are ended before the cap unsealing operation is ended. In addition, the ejection control section 122 ends the printing ejection operation before the time Tf.

At the time Tf, the circulation operation and the minute vibration operation are in progress so that thickening of ink inside and near the nozzle N[m1] is suppressed. When the printing ejection operation is ended before the time Tf, the occurrence of ejection failure can be suppressed throughout a period from the start of the printing ejection operation and the end of the printing ejection operation.

The minute vibration control section 123 is continuing the minute vibration operation at the time Tb.

In an embodiment in which the minute vibration operation is ended at the time Tb at which the circulation operation is started, progress of thickening of ink inside and near the nozzle N starts after the end of the minute vibration operation. Meanwhile, according to the first embodiment, the minute vibration operation is in progress at the time Tb. Therefore, the degree of thickening of ink in the nozzle N is lowered and thus a probability of a phenomenon in which ink cannot be ejected because of progress of thickening of ink in the nozzle N attributable to the circulation operation can be reduced.

The minute vibration control section 123 supplies the drive signal Com-B having the minute vibration waveform PS to the piezoelectric element PZa[m1] so as to control the minute vibration operation such that the stream FRb of ink in the Z1 direction that is generated in the nozzle N[m1] reaches the individual flow path PJ[m1].

According to the first embodiment, an effect of stirring ink inside and near the nozzle N and an effect of diffusing thickening of ink can be enhanced in comparison with an embodiment in which the stream FRb does not reach the nozzle flow path Nf.

In addition, the individual flow path PJ[m1] includes the pressure chamber Ca[m1] positioned upstream of the nozzle N[m1] and the pressure chamber Cb[m1] positioned downstream of the nozzle N[m1], the piezoelectric element PZa [m1] corresponds to the pressure chamber Ca[m1], the liquid ejection head 10 further includes the piezoelectric element PZb[m1] that corresponds to the pressure chamber Cb[m1] and that is driven in response to supply of the drive signal Com, and the minute vibration control section 123 controls the minute vibration operation by driving both of the piezoelectric element PZa[m1] and the piezoelectric element PZb[m1].

As described above, a pressure applied to ink from the piezoelectric element PZa and a pressure applied to the ink from the piezoelectric element PZb are merged with each other in the vicinity of the nozzle N which is positioned at the center of the individual flow path PJ and a portion of the merged pressure proceeds in a direction toward the nozzle N. Therefore, according to the first embodiment, the stream FRb along the Z-axis can be generated.

In addition, the individual flow path PJ[m1] further includes the narrowed portion Ap1[m1] that is positioned upstream of the pressure chamber Ca[m1] and of which the flow path resistance is higher than that of the pressure chamber Ca[m1] and the narrowed portion Ap2 [m1] that is positioned downstream of the pressure chamber Cb[m1] and of which the flow path resistance is higher than that of the pressure chamber Cb[m1].

When a pressure is applied to the pressure chamber Ca[m1] because of the minute vibration operation, the pressure is transmitted to a position upstream of the pressure chamber Ca[m1] and a position downstream of the pressure chamber Ca[m1]. Here, the narrowed portion Ap1[m1] positioned upstream of the pressure chamber Ca[m1] has a higher flow path resistance than that of the pressure chamber Ca[m1]. Therefore, the ratio of a pressure transmitted to the position downstream of the pressure chamber Ca[m1] to the pressure applied to the pressure chamber Ca[m1] is larger than the ratio of a pressure transmitted to the narrowed portion Ap1 to the pressure applied to the pressure chamber Ca[m1]. Similarly, the ratio of a pressure transmitted to the position downstream of the pressure chamber Cb[m1] to the pressure applied to the pressure chamber Cb[m1] is larger than the ratio of a pressure transmitted to the narrowed portion Ap2 to the pressure applied to the pressure chamber Cb[m1]. Therefore, with the minute vibration operation according to the first embodiment, it is possible to generate the stream FRb along the Z-axis that is large in comparison with the embodiment in which no narrowed portion Ap is present. Since the larger stream FRb can be generated, with the liquid ejecting apparatus 100 according to the first embodiment, it is possible to stir the thickened ink Bu inside and near the nozzle N in a short period of time.

The liquid ejection head 10 further includes the piezoelectric element PZa[m2] that is driven in response to supply of the drive signal Com, the nozzle N[m2] that ejects ink by means of a pressure that is applied when the piezoelectric element PZa[m2] is driven, the individual flow path PJ[m2] that communicates with the nozzle N[m2], through which ink is supplied to the nozzle N[m2], and through which ink not ejected from the nozzle N[m2] is discharged, the common supply flow path CF1 that is coupled to both of the individual flow path PJ[m1] and the individual flow path PJ[m2] and through which ink is supplied to the individual flow path PJ[m1] and the individual flow path PJ[m2], the common discharge flow path CF2 that is coupled to both of the individual flow path PJ[m1] and the individual flow path PJ[m2] and through which the ink is discharged from the individual flow path PJ[m1] and the individual flow path PJ[m2], and the bypass flow path BP that is coupled to the common supply flow path CF1 and the common discharge flow path CF2 and of which the flow path resistance is lower than those of the individual flow path PJ[m1] and the individual flow path PJ[m2], the liquid ejecting apparatus 100 further includes the pump 157 that is provided upstream of the liquid ejection head 10, and the circulation control section 127 controls the circulation operation by driving the pump 157.

An ink stream in the bypass flow path BP that is caused by the circulation operation is larger than the stream FRc of ink in each of the individual flow path PJ[m1] and the individual flow path PJ[m2] that is caused by the circulation operation. Therefore, the ratio of the size of the stream FRb caused by a minute vibration to the size of the stream FRc according to the first embodiment is larger than the ratio of the size of the stream FRb to the size of the stream FRc according to an embodiment in which the bypass flow path BP is not provided. Accordingly, when both of the minute vibration operation and the circulation operation are in progress, the thickened ink can be easily diffused to the outside of the nozzle N by means of the stream FRb caused by the minute vibration operation even if the thickened ink flows into the nozzle N because of the circulation operation.

In addition, a pressure that is applied to ink in the individual flow path PJ per unit period because of the minute vibration operation is larger than a pressure that is applied to the ink in the individual flow path PJ per unit period because of the circulation operation.

In comparison with an embodiment in which a pressure that is applied per unit period because of the minute vibration operation is smaller than a pressure that is applied per unit period because of the circulation operation, when both of the minute vibration operation and the circulation operation are in progress, the thickened ink can be easily diffused to the outside of the nozzle N by means of the stream FRb caused by the minute vibration operation even if the thickened ink flows into the nozzle N because of the circulation operation.

2. Second Embodiment

A second embodiment is different from the first embodiment in that a flushing operation is performed immediately before the printing ejection operation. Hereinafter, the second embodiment will be described.

Figure 21:
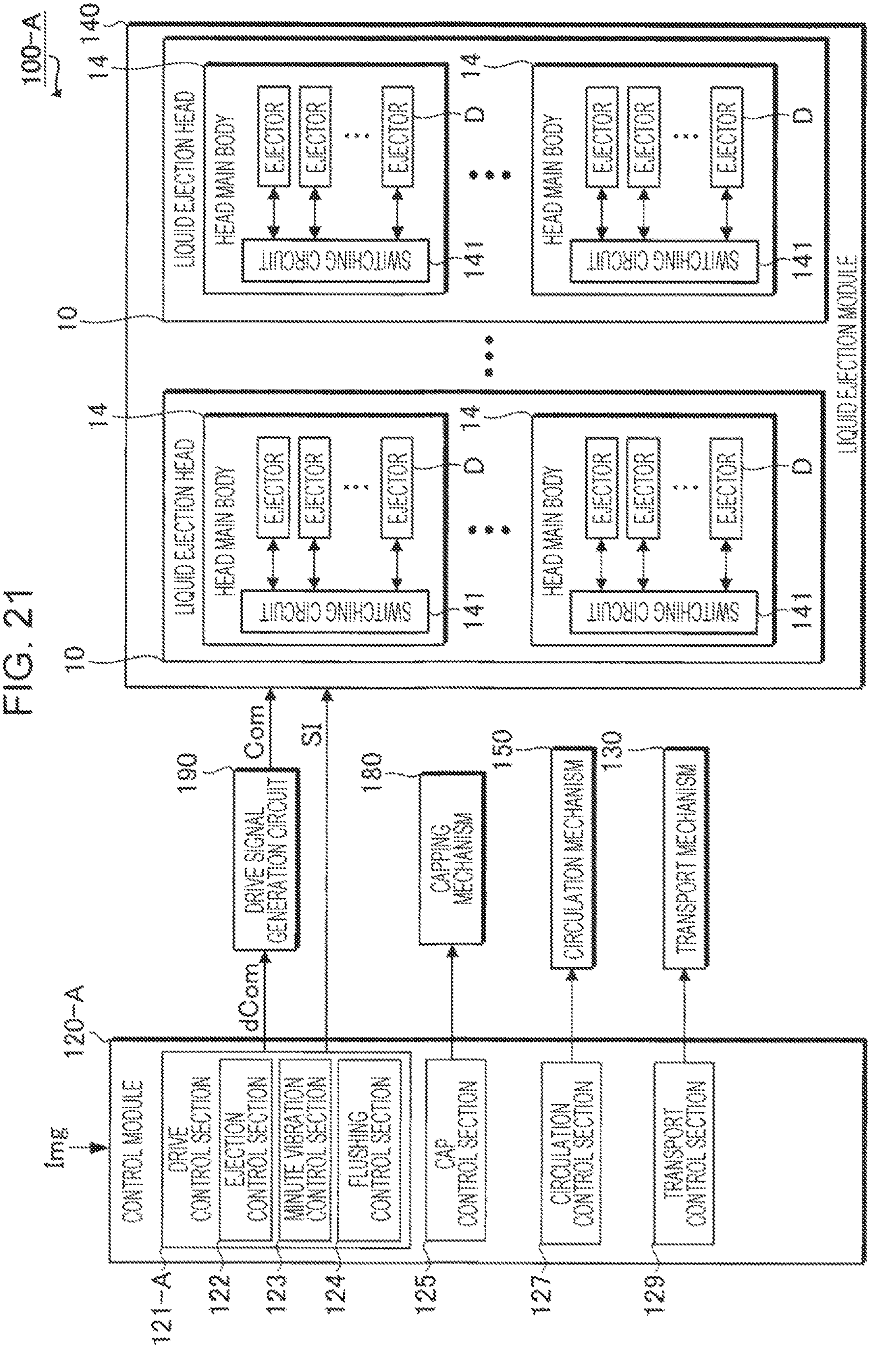
FIG. 21 is a functional block diagram showing an example of the configuration of a liquid ejecting apparatus according to a second embodiment.

FIG. 21 is a functional block diagram showing an example of the configuration of a liquid ejecting apparatus 100-A according to a second embodiment. The liquid ejecting apparatus 100-A is different from the liquid ejecting apparatus 100 in that the liquid ejecting apparatus 100-A includes a control module 120-A instead of the control module 120. The control module 120-A is different from the control module 120 in that the control module 120-A functions as a drive control section 121-A instead of functioning as the drive control section 121. The drive control section 121-A is different from the drive control section 121 in that the drive control section 121-A functions as a flushing control section 124 as well. The flushing control section 124 controls a flushing operation of forcibly ejecting, from the nozzle N, ink that does not directly contribute to image formation. Specifically, the flushing control section 124 performs the flushing operation by supplying, to the piezoelectric elements PZ, the drive signal Com having a flushing waveform for forcible ejection of ink from the nozzle N. The flushing waveform may be any waveform as long as ink is ejected. However, for example, the flushing waveform may be a waveform that causes the pressure chambers C to vibrate more than in the case of the ejection waveform PX so that the thickened ink can be ejected. The flushing waveform is different from the minute vibration waveform PS because the flushing waveform is a waveform for ejection of ink.

Note that, in the second embodiment, in addition to the ejection waveform PX, the flushing waveform is also an example of the "second waveform". Similarly, in addition to the printing ejection operation, the flushing operation is also an example of the "ejection operation of causing liquid to be ejected from the first nozzle".

A series of operations in the liquid ejecting apparatus 100-A will be described with reference to FIG. 22.

2-1. Operation in Liquid Ejecting Apparatus 100-A

Figure 22:
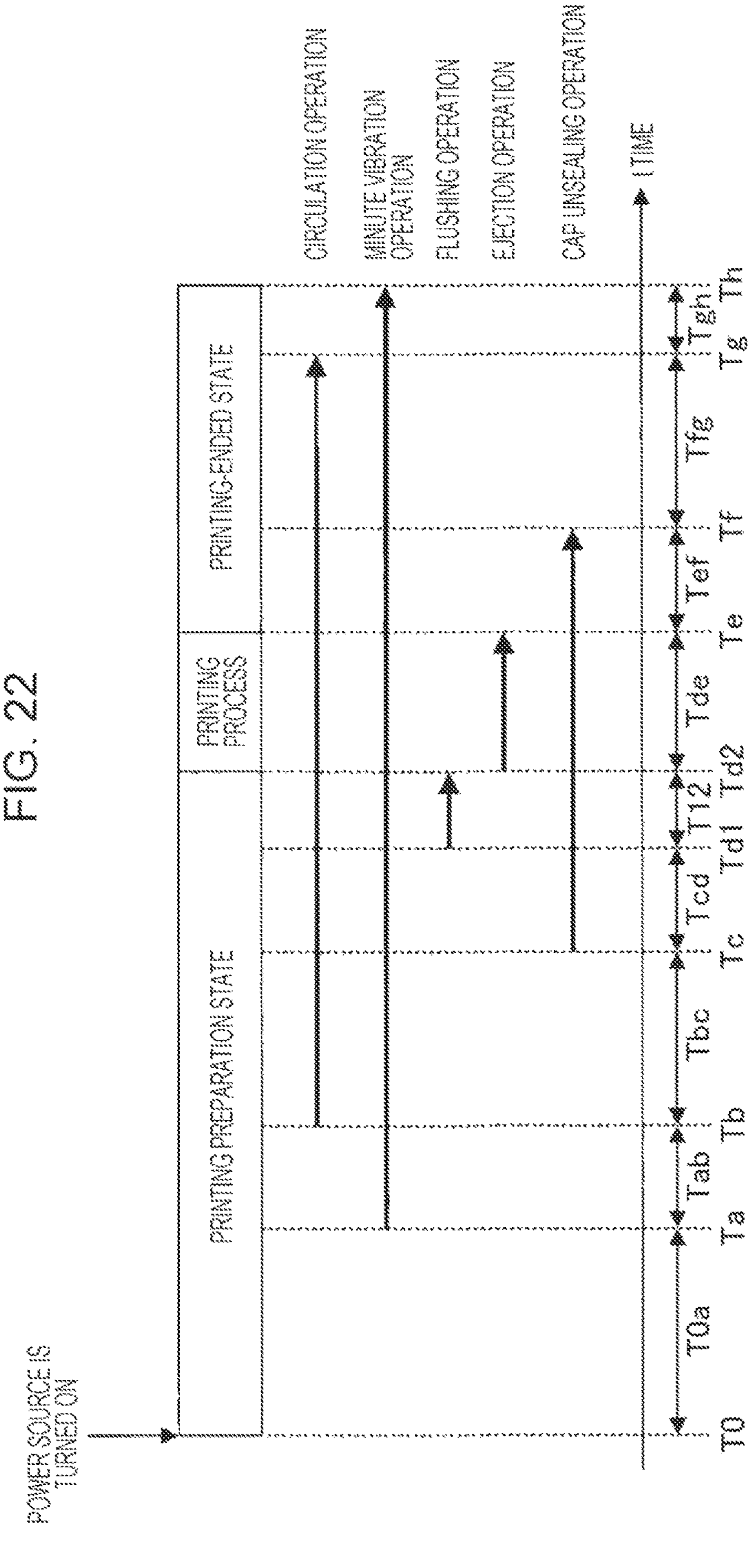
FIG. 22 is a diagram showing a series of operations of the liquid ejecting apparatus.

FIG. 22 is a diagram showing a series of operations of the liquid ejecting apparatus 100-A. The series of operations in the liquid ejecting apparatus 100-A is different from the series of operations in the liquid ejecting apparatus 100 in that the flushing operation is started at a time Td1 later than the time Tc, the flushing operation is ended at a time Td2 later than the time Td1, and the printing ejection operation is performed throughout a period from the time Td2 to the time Te. As shown in FIG. 22, throughout a period from the time T0 to the time Td2, the state of the liquid ejecting apparatus 100-A is the printing preparation state. Throughout a period from the time Td2 to a time Te, the liquid ejecting apparatus 100-A performs the printing process. Throughout a period from the time Te to a time Th, the state of the liquid ejecting apparatus 100-A is the printing-ended state.

In the second embodiment, the description will be made on assumption that all of M ejectors D of one head main body 14 perform the flushing operation in a period T12 from the time Td1 to the time Td2. However, a configuration in which a portion of the M ejectors D performs the flushing operation and the remainder of the M ejectors D performs the minute vibration operation may also be adopted.

Since the printing ejection operation is not performed in the period T12, the flushing control section 124 generates the waveform designation signal dCom such that the drive signal Com-A having the flushing waveform is supplied to the head main body 14, for example. Then, the flushing control section 124 generates the individual designation signal Sd[m] for designation of the flushing operation, with respect to every m ranging from 1 to M. In the period T12, the individual designation signal Sd[m] may show any of a value (1) for designation of the flushing operation and a value (0) for designation of the minute vibration operation. When the drive signal Com-A having the flushing waveform is supplied to the head main body 14 and the individual designation signal Sd[m] shows the value (1), the flushing operation is performed. In the period T12, the minute vibration operation is temporarily stopped in the ejector D for which the flushing operation is designated.

3. Modification Example

Each of the above-described embodiments can be modified in various manners. A specific embodiment of modification will be described below. Any two or more embodiments selected from the following examples can be appropriately combined with each other as long as there is no contradiction.

3-1. First Modification Example

In each of the above-described embodiments, the period Tgh is shorter than the period Tab. However, the disclosure is not limited thereto. For example, the period Tgh may be longer than the period Tab. In other words, a period in which only the minute vibration operation is performed after the printing ejection operation may be longer than a period in which only the minute vibration operation is performed before the printing ejection operation.

When the period before the printing ejection operation is long, a period for which a user waits for the end of the printing process is made long. Meanwhile, at a time after the printing ejection operation, an image has been already formed on the medium PP and thus the length of a period for which a user waits for the end of the printing process is not changed even if the period Tgh is made long. Therefore, according to the first modification example, a period for which the user waits for the end of the printing process can be shortened and thickening after the printing ejection operation can be eliminated more in comparison with an embodiment in which the period Tgh is shorter than the period Tab.

3-2. Second Modification Example

In the first embodiment and the first modification example based on the first embodiment, the printing ejection operation is started after the cap unsealing operation is started. However, the cap unsealing operation and the printing ejection operation may not be performed. For example, when the printing ejection operation is not performed for a long period and thus there is a possibility that thickening of ink is excessively progressed, the liquid ejecting apparatus 100 may start the minute vibration operation first, start the circulation operation thereafter, end the circulation operation after a certain period elapses with the cap sealing operation being performed, and end the minute vibration operation after the end of the circulation operation.

3-3. Third Modification Example

In addition, in the second embodiment and the first modification example based on the second embodiment, the printing ejection operation is started after the flushing operation is performed. However, the printing ejection operation may not be performed. For example, when the printing ejection operation is not performed for a long period and thus there is a possibility that thickening of ink is excessively progressed, the liquid ejecting apparatus 100-A may start the minute vibration operation first, start the circulation operation thereafter, start the cap unsealing operation after the start of the circulation operation, start the cap sealing operation without the printing ejection operation after performing the flushing operation after the start of the cap unsealing operation, end the circulation operation after the start of the cap sealing operation, and end the minute vibration operation after the end of the circulation operation.

3-4. Fourth Modification Example

In each of the above-described embodiments, the period Tab is shorter than the period Tbc. However, the disclosure is not limited thereto. For example, the period Tab may have the same length as the period Tbc and may be longer than the period Tbc.

3-5. Fifth Modification Example

In each of the above-described embodiments, the time Tg is later than the time Th. However, the disclosure it not limited thereto. For example, the time Tg may be the same time as the time Th and may be earlier than the time Th.

3-6. Sixth Modification Example

In each of the above-described embodiments, one individual flow path PJ includes two pressure chambers C.

However, one individual flow path PJ may include one pressure chamber C. Examples of an embodiment in which one individual flow path PJ includes one pressure chamber C include two embodiments as follows. In the first of the two embodiments, all of the M individual flow paths PJ include pressure chambers Ca without the pressure chambers Cb. In the second of the two embodiments, odd-numbered individual flow paths PJ of the M individual flow paths PJ include the pressure chambers Ca without the pressure chambers Cb and even-numbered individual flow paths PJ include the pressure chambers Cb without the pressure chambers Ca.

3-7. Seventh Modification Example

In each of the above-described embodiments, the liquid ejection head 10 constitutes a line head. However, the disclosure is not limited to such a configuration and a serial type configuration in which the liquid ejection head 10 reciprocates along the X-axis may also be adopted.

3-8. Eighth Modification Example

The liquid ejecting apparatus 100 described in each of the above-described embodiments can be adopted for various devices such as a facsimile machine and a copier in addition to a device dedicated to printing. However, the purpose of use of the liquid ejecting apparatus of the present disclosure is not limited to printing. For example, a liquid ejecting apparatus that ejects a solution of a coloring material is used as a manufacturing device forming a color filter of a liquid crystal display device. In addition, a liquid ejecting apparatus that ejects a solution of a conductive material is used as a manufacturing device forming a wire or an electrode on a wiring substrate.

What is claimed is:

1. A liquid ejecting apparatus comprising:

a liquid ejection head including a first piezoelectric element that is driven in response to supply of a drive signal, a first nozzle that ejects liquid by means of a pressure that is applied when the first piezoelectric element is driven, and a first individual flow path that communicates with the first nozzle, through which the liquid is supplied to the first nozzle, and through which the liquid not ejected from the first nozzle is discharged;

a circulation control section that controls a circulation operation of circulating the liquid in the first individual flow path; and a minute vibration control section that supplies a drive signal having a first waveform to the first piezoelectric element so as to control a minute vibration operation of causing the liquid in the first nozzle to vibrate to such a degree that the liquid is not ejected from the first nozzle, wherein the circulation control section starts the circulation operation at a first time, and the minute vibration control section starts the minute vibration operation at a second time earlier than the first time and is continuing the minute vibration operation at the first time.

2. The liquid ejecting apparatus according to claim 1, further comprising:

a cap that seals a nozzle surface provided with the first nozzle; and a cap control section that controls an unsealing operation of unsealing the nozzle surface sealed by the cap, wherein the cap control section starts the unsealing operation at a third time later than the second time.

3. The liquid ejecting apparatus according to claim 2, wherein a time interval between the first time and the second time is shorter than a time interval between the second time and the third time.

4. The liquid ejecting apparatus according to claim 2, further comprising:

an ejection control section that supplies, to the first piezoelectric element, a drive signal having a second waveform different from the first waveform so as to control an ejection operation of causing liquid to be ejected from the first nozzle, wherein the ejection control section starts the ejection operation after the third time.

5. The liquid ejecting apparatus according to claim 4, wherein the circulation control section ends the circulation operation at a fourth time later than an end of the ejection operation, and the minute vibration control section ends the minute vibration operation at a fifth time later than the end of the ejection operation.

6. The liquid ejecting apparatus according to claim 5, wherein the fourth time is earlier than the fifth time.

7. The liquid ejecting apparatus according to claim 6, wherein
a time interval between the fourth time and the fifth time is shorter than a time interval between the first time and the second time.

8. The liquid ejecting apparatus according to claim 6, wherein
a time interval between the fourth time and the fifth time is longer than a time interval between the first time and the second time.

9. The liquid ejecting apparatus according to claim 1, further comprising:
a cap that seals a nozzle surface provided with the first nozzle; and
a cap control section that controls an unsealing operation of unsealing the nozzle surface sealed by the cap, wherein
the circulation control section ends the circulation operation at a fourth time,
the minute vibration control section ends the minute vibration operation at a fifth time, and
the cap control section ends the unsealing operation at a sixth time earlier than the fourth time and the fifth time.

10. The liquid ejecting apparatus according to claim 9, further comprising:
an ejection control section that controls an ejection operation of causing liquid to be ejected from the first nozzle, wherein
the ejection control section ends the ejection operation before the sixth time.

11. The liquid ejecting apparatus according to claim 1, wherein
the minute vibration control section supplies the drive signal having the first waveform to the first piezoelectric element so as to control the minute vibration operation such that a liquid stream toward the first individual flow path reaches the first individual flow path, the liquid stream being generated in the first nozzle.

12. The liquid ejecting apparatus according to claim 1, wherein
the first individual flow path includes a first pressure chamber positioned upstream of the first nozzle and a second pressure chamber positioned downstream of the first nozzle,
the first piezoelectric element corresponds to the first pressure chamber,
the liquid ejection head further includes a second piezoelectric element that corresponds to the second pressure chamber and that is driven in response to supply of a drive signal, and
the minute vibration control section controls the minute vibration operation by driving both of the first piezoelectric element and the second piezoelectric element.

13. The liquid ejecting apparatus according to claim 12, wherein
the first individual flow path further includes a first narrowed portion that is positioned upstream of the first pressure chamber and of which a flow path resistance is higher than that of the first pressure chamber and a second narrowed portion that is positioned downstream of the second pressure chamber and of which a flow path resistance is higher than that of the second pressure chamber.

14. A liquid ejecting apparatus comprising:
a liquid ejection head including a first piezoelectric element that is driven in response to supply of a drive signal, a first nozzle that ejects liquid by means of a pressure that is applied when the first piezoelectric element is driven, and a first individual flow path that communicates with the first nozzle, through which the liquid is supplied to the first nozzle, and through which the liquid not ejected from the first nozzle is discharged;
a circulation control section that controls a circulation operation of circulating the liquid in the first individual flow path; and
a minute vibration control section that supplies a drive signal having a first waveform to the first piezoelectric element so as to control a minute vibration operation of causing the liquid in the first nozzle to vibrate to such a degree that the liquid is not ejected from the first nozzle, wherein
the circulation control section starts the circulation operation at a first time,
the minute vibration control section starts the minute vibration operation at a second time earlier than the first time,
the liquid ejection head further includes:
a third piezoelectric element that is driven in response to supply of a drive signal;
a second nozzle that ejects the liquid by means of a pressure that is applied when the third piezoelectric element is driven;
a second individual flow path that communicates with the second nozzle, through which the liquid is supplied to the second nozzle, and through which the liquid not ejected from the second nozzle is discharged;
a common supply flow path that is coupled to both of the first individual flow path and the second individual flow path and through which the liquid is supplied to the first individual flow path and the second individual flow path;
a common discharge flow path that is coupled to both of the first individual flow path and the second individual flow path and through which the liquid is discharged from the first individual flow path and the second individual flow path; and
a bypass flow path that is coupled to the common supply flow path and the common discharge flow path and of which a flow path resistance is lower than those of the first individual flow path and the second individual flow path,
the liquid ejecting apparatus further comprises one or more flow mechanisms provided at one or both of a position upstream of the liquid ejection head and a position downstream of the liquid ejection head,
the circulation control section controls the circulation operation by driving the one or more flow mechanisms, and
a pressure that is applied to the liquid in the first individual flow path per unit period because of the minute vibration operation is larger than a pressure that is applied to the liquid in the first individual flow path per unit period because of the circulation operation.

15. A liquid ejecting apparatus comprising:
a liquid ejection head including a first piezoelectric element that is driven in response to supply of a drive signal, a first nozzle that ejects liquid by means of a pressure that is applied when the first piezoelectric element is driven, and a first individual flow path that communicates with the first nozzle, through which the liquid is supplied to the first nozzle, and through which the liquid not ejected from the first nozzle is discharged;

a circulation control section that controls a circulation operation of circulating the liquid in the first individual flow path;

a minute vibration control section that supplies a drive signal having a first waveform to the first piezoelectric element so as to control a minute vibration operation of causing the liquid in the first nozzle to vibrate to such a degree that the liquid is not ejected from the first nozzle;

a cap that seals a nozzle surface provided with the first nozzle; and a cap control section that controls an unsealing operation of unsealing the nozzle surface sealed by the cap, wherein the circulation control section starts the circulation operation at a first time, the minute vibration control section starts the minute vibration operation at a second time earlier than the first time, the cap control section starts the unsealing operation at a third time later than the second time, and a time interval between the first time and the second time is shorter than a time interval between the second time and the third time.

16. The liquid ejecting apparatus according to claim 15, further comprising:

an ejection control section that supplies, to the first piezoelectric element, a drive signal having a second waveform different from the first waveform so as to control an ejection operation of causing liquid to be ejected from the first nozzle, wherein the ejection control section starts the ejection operation after the third time.

17. The liquid ejecting apparatus according to claim 16, wherein the circulation control section ends the circulation operation at a fourth time later than an end of the ejection operation, and the minute vibration control section ends the minute vibration operation at a fifth time later than the end of the ejection operation.

18. The liquid ejecting apparatus according to claim 17, wherein the fourth time is earlier than the fifth time.

19. The liquid ejecting apparatus according to claim 15, wherein the circulation control section ends the circulation operation at a fourth time, the minute vibration control section ends the minute vibration operation at a fifth time, and the cap control section ends the unsealing operation at a sixth time earlier than the fourth time and the fifth time.

* * * * *